(12) United States Patent
Li et al.

(10) Patent No.: US 11,711,528 B2
(45) Date of Patent: Jul. 25, 2023

(54) SYSTEMS AND METHODS FOR LINER MODEL DERIVATION

(71) Applicant: ALIBABA GROUP HOLDING LIMITED, Grand Cayman (KY)

(72) Inventors: Xinwei Li, Beijing (CN); Jie Chen, Beijing (CN); Ru-Ling Liao, Beijing (CN); Yan Ye, San Mateo, CA (US)

(73) Assignee: ALIBABA GROUP HOLDING LIMITED, George Town (KY)

( * ) Notice: Subject to any disclaimer, the term of this patent is extended or adjusted under 35 U.S.C. 154(b) by 0 days.

(21) Appl. No.: 17/650,336

(22) Filed: Feb. 8, 2022

(65) Prior Publication Data

US 2022/0272363 A1 Aug. 25, 2022

Related U.S. Application Data

(60) Provisional application No. 63/151,850, filed on Feb. 22, 2021.

(51) Int. Cl.
*H04N 19/196* (2014.01)
*H04N 19/44* (2014.01)
*H04N 19/184* (2014.01)
*H04N 19/159* (2014.01)

(52) U.S. Cl.
CPC ......... *H04N 19/196* (2014.11); *H04N 19/159* (2014.11); *H04N 19/184* (2014.11); *H04N 19/44* (2014.11)

(58) Field of Classification Search
CPC .. H04N 19/196; H04N 19/159; H04N 19/184; H04N 19/44; H04N 19/167; H04N 19/176; H04N 19/593; H04N 19/105
See application file for complete search history.

(56) References Cited

U.S. PATENT DOCUMENTS

2021/0392321 A1* 12/2021 Kim ..................... H04N 19/167

OTHER PUBLICATIONS

Call for New generation AVS3 video coding proposals, AVS-N2509, Dec. 2017, 4 pages.
HPM, ftp://47.93.196.121/Public/codec/video_codec/HPM.

* cited by examiner

*Primary Examiner* — Nam D Pham
(74) *Attorney, Agent, or Firm* — Finnegan, Henderson, Farabow, Garrett & Dunner, LLP

(57) ABSTRACT

The present disclosure provides a video data processing method. The method includes receiving a bitstream; decoding an index associated with a coding unit based on the bitstream, the index indicating a selection mode among at least four selection modes; determining four samples based on the index; determining two parameters based on the four samples; determining predicted samples of the coding unit based on the two parameters; and decoding the coding unit based on the predicted samples.

9 Claims, 18 Drawing Sheets

| synElVal | Index | | | | | | | |
|---|---|---|---|---|---|---|---|---|
| 0 | 1 | | | | | | | |
| 1 | 0 | 1 | | | | | | |
| 2 | 0 | 0 | 1 | | | | | |
| 3 | 0 | 0 | 0 | 1 | | | | |
| 4 | 0 | 0 | 0 | 0 | 1 | | | |
| 5 | 0 | 0 | 0 | 0 | 0 | 1 | | |
| ... | 0 | 0 | 0 | 0 | 0 | 0 | ... | |
| maxVal-1 | 0 | 0 | 0 | 0 | 0 | 0 | ... | 1 |
| maxVal | 0 | 0 | 0 | 0 | 0 | 0 | ... | 0 |

FIG. 8

SYSTEMS AND METHODS FOR LINER MODEL DERIVATION

CROSS-REFERENCE TO RELATED APPLICATIONS

The disclosure claims the benefits of priority to U.S. Provisional Application No. 63/151,850, filed on Feb. 22, 2021, which is incorporated herein by reference in its entirety.

TECHNICAL FIELD

The present disclosure generally relates to video processing, and more particularly, to systems and methods for liner model derivation.

BACKGROUND

A video is a set of static pictures (or "frames") capturing the visual information. To reduce the storage memory and the transmission bandwidth, a video can be compressed before storage or transmission and decompressed before display. The compression process is usually referred to as encoding and the decompression process is usually referred to as decoding. There are various video coding formats which use standardized video coding technologies, most commonly based on prediction, transform, quantization, entropy coding and in-loop filtering. The video coding standards, such as the High Efficiency Video Coding (HEVC/H.265) standard, the Versatile Video Coding (VVC/H.266) standard, and AVS standards, specifying the specific video coding formats, are developed by standardization organizations. With more and more advanced video coding technologies being adopted in the video standards, the coding efficiency of the new video coding standards get higher and higher.

SUMMARY OF THE DISCLOSURE

Embodiments of the present disclosure provide a video data processing method. The method includes receiving a bitstream; decoding an index associated with a coding unit based on the bitstream, the index indicating a selection mode among at least four selection modes; determining four samples based on the index; determining two parameters based on the four samples; determining predicted samples of the coding unit based on the two parameters; and decoding the coding unit based on the predicted samples.

Embodiments of the present disclosure provide an apparatus for performing video data processing. The apparatus includes a memory figured to store instructions; and one or more processors configured to execute the instructions to cause the apparatus to perform: receiving a bitstream; decoding an index associated with a coding unit based on the bitstream, the index indicating a selection mode among at least four selection modes; determining four samples based on the index; determining two parameters based on the four samples; determining predicted samples of the coding unit based on the two parameters; and decoding the coding unit based on the predicted samples.

Embodiments of the present disclosure provide a non-transitory computer-readable storage medium that stores a set of instructions that is executable by one or more processors of an apparatus to cause the apparatus to initiate a method for performing video data processing. The method includes receiving a bitstream; decoding an index associated with a coding unit based on the bitstream, the index indicating a selection mode among at least four selection modes; determining four samples based on the index; determining two parameters based on the four samples; determining predicted samples of the coding unit based on the two parameters; and decoding the coding unit based on the predicted samples.

BRIEF DESCRIPTION OF THE DRAWINGS

Embodiments and various aspects of the present disclosure are illustrated in the following detailed description and the accompanying figures. Various features shown in the figures are not drawn to scale.

FIG. 8 is a schematic diagram illustrating a truncated unary code table, according to some embodiments of the present disclosure.

DETAILED DESCRIPTION

Figure 1:
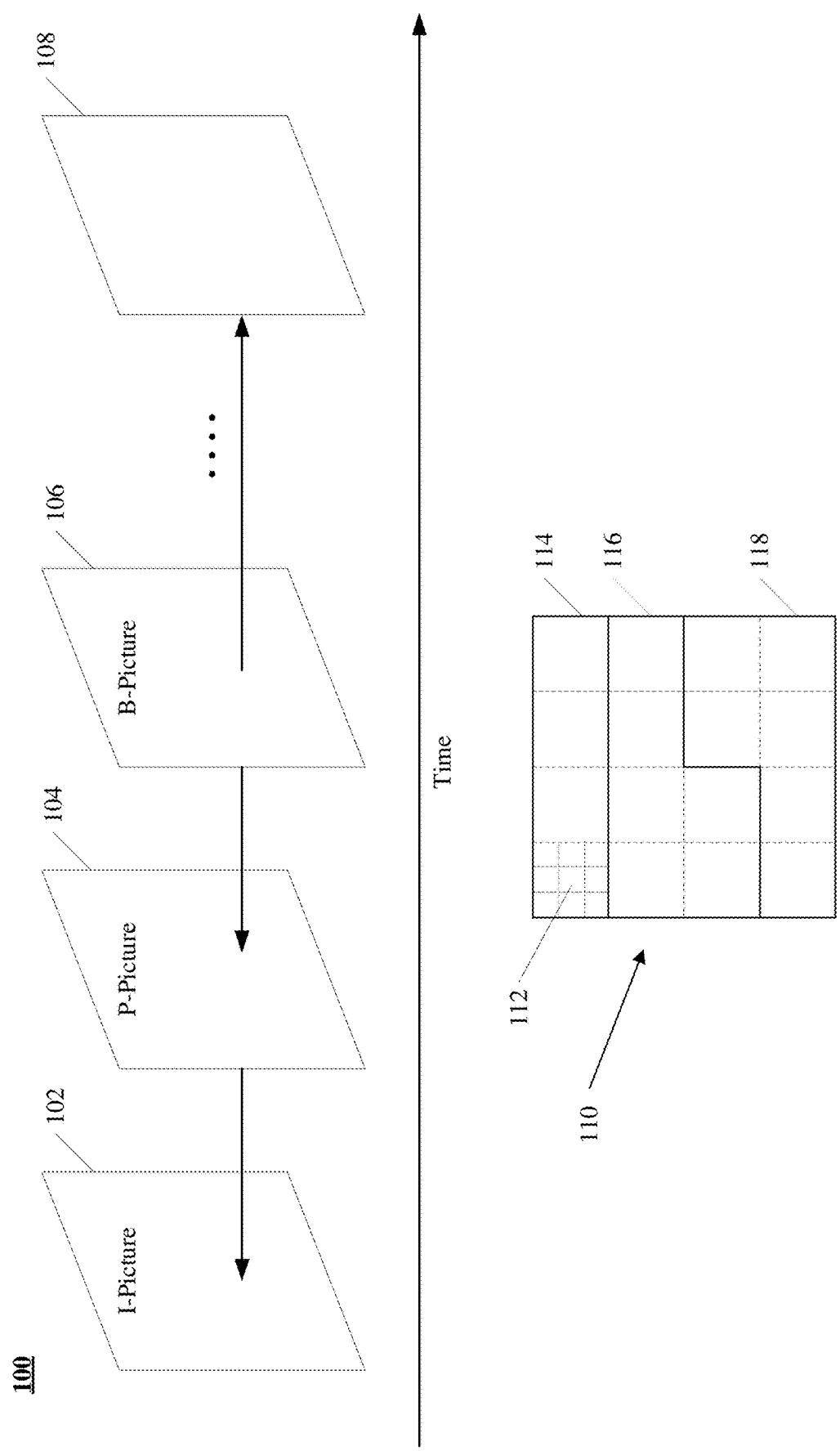
FIG. 1 is a schematic diagram illustrating structures of an example video sequence, according to some embodiments of the present disclosure.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims. Particular aspects of the present disclosure are described in greater detail below. The terms and definitions provided herein control, if in conflict with terms and/or definitions incorporated by reference.

Audio Video coding Standard (AVS) Workgroup, which was founded in China in 2002, is currently developing the AVS3 video standard, a third generation of AVS video standard. The predecessors of the AVS3 standard, AVS1 and AVS2, were issued as China in the year of 2006 and 2016, respectively. In December of 2017, a call for proposals (CfP) was issued by the AVS workgroup to formally start the development of the third generation of AVS standard, AVS3. In December of 2018, a High Performance Model (HPM) was chosen by the workgroup as a new reference software platform for the AVS3 standard development. The initial technologies in HPM was inherited from AVS2 standard, and based on that, more and more new advanced video coding technologies were adopted to improve the compression performance. In 2019, for example, the first phase of the AVS3 standard was finalized and got more than 20% coding performance gain compared with its predecessor AVS2, and the second phase of AVS3 standard is still being developed on top of the first phase of AVS3 to get further coding efficiencies.

The AVS3 standard has been developed recently, and continues to include more coding technologies that provide better compression performance. AVS3 is based on the same hybrid video coding system that has been used in modern video compression standards such as AVS1, AVS2, H.265/HEVC, H.264/AVC, MPEG2, H.263, etc.

A video is a set of static pictures (or "frames") arranged in a temporal sequence to store visual information. A video capture device (e.g., a camera) can be used to capture and store those pictures in a temporal sequence, and a video playback device (e.g., a television, a computer, a smartphone, a tablet computer, a video player, or any end-user terminal with a function of display) can be used to display such pictures in the temporal sequence. Also, in some applications, a video capturing device can transmit the captured video to the video playback device (e.g., a computer with a monitor) in real-time, such as for surveillance, conferencing, or live broadcasting.

For reducing the storage space and the transmission bandwidth needed by such applications, the video can be compressed before storage and transmission and decompressed before the display. The compression and decompression can be implemented by software executed by a processor (e.g., a processor of a generic computer) or specialized hardware. The module for compression is generally referred to as an "encoder," and the module for decompression is generally referred to as a "decoder." The encoder and decoder can be collectively referred to as a "codec." The encoder and decoder can be implemented as any of a variety of suitable hardware, software, or a combination thereof. For example, the hardware implementation of the encoder and decoder can include circuitry, such as one or more microprocessors, digital signal processors (DSPs), application-specific integrated circuits (ASICs), field-programmable gate arrays (FPGAs), discrete logic, or any combinations thereof. The software implementation of the encoder and decoder can include program codes, computer-executable instructions, firmware, or any suitable computer-implemented algorithm or process fixed in a computer-readable medium. Video compression and decompression can be implemented by various algorithms or standards, such as MPEG-1, MPEG-2, MPEG-4, H.26x, AVS series, or the like. In some applications, the codec can decompress the video from a first coding standard and re-compress the decompressed video using a second coding standard, in which case the codec can be referred to as a "transcoder."

The video encoding process can identify and keep useful information that can be used to reconstruct a picture and disregard unimportant information for the reconstruction. If the disregarded, unimportant information cannot be fully reconstructed, such an encoding process can be referred to as "lossy." Otherwise, it can be referred to as "lossless." Most encoding processes are lossy, which is a tradeoff to reduce the needed storage space and the transmission bandwidth.

The useful information of a picture being encoded (referred to as a "current picture") include changes with respect to a reference picture (e.g., a picture previously encoded and reconstructed). Such changes can include position changes, luminosity changes, or color changes of the pixels, among which the position changes are mostly concerned. Position changes of a group of pixels that represent an object can reflect the motion of the object between the reference picture and the current picture.

A picture coded without referencing another picture (i.e., it is its own reference picture) is referred to as an "I-picture." A picture is referred to as a "P-picture" if some or all blocks (e.g., blocks that generally refer to portions of the video picture) in the picture are predicted using intra prediction or inter prediction with one reference picture (e.g., uni-prediction). A picture is referred to as a "B-picture" if at least one block in it is predicted with two reference pictures (e.g., bi-prediction).

FIG. 1 illustrates structures of an example video sequence 100, according to some embodiments of the present disclosure. Video sequence 100 can be a live video or a video having been captured and archived. Video 100 can be a real-life video, a computer-generated video (e.g., computer game video), or a combination thereof (e.g., a real-life video with augmented-reality effects). Video sequence 100 can be inputted from a video capture device (e.g., a camera), a video archive (e.g., a video file stored in a storage device)

containing previously captured video, or a video feed interface (e.g., a video broadcast transceiver) to receive video from a video content provider.

As shown in FIG. 1, video sequence 100 can include a series of pictures arranged temporally along a timeline, including pictures 102, 104, 106, and 108. Pictures 102-106 are continuous, and there are more pictures between pictures 106 and 108. In FIG. 1, picture 102 is an I-picture, the reference picture of which is picture 102 itself. Picture 104 is a P-picture, the reference picture of which is picture 102, as indicated by the arrow. Picture 106 is a B-picture, the reference pictures of which are pictures 104 and 108, as indicated by the arrows. In some embodiments, the reference picture of a picture (e.g., picture 104) can be not immediately preceding or following the picture. For example, the reference picture of picture 104 can be a picture preceding picture 102. It should be noted that the reference pictures of pictures 102-106 are only examples, and the present disclosure does not limit embodiments of the reference pictures as the examples shown in FIG. 1.

Typically, video codecs do not encode or decode an entire picture at one time due to the computing complexity of such tasks. Rather, they can split the picture into basic segments, and encode or decode the picture segment by segment. Such basic segments are referred to as basic processing units ("BPUs") in the present disclosure. For example, structure 110 in FIG. 1 shows an example structure of a picture of video sequence 100 (e.g., any of pictures 102-108). In structure 110, a picture is divided into 4×4 basic processing units, the boundaries of which are shown as dash lines. In some embodiments, the basic processing units can be referred to as "macroblocks" in some video coding standards (e.g., MPEG family, H.261, H.263, or H.264/AVC), or as "coding tree units" ("CTUs") in some other video coding standards (e.g., H.265/HEVC, H.266/VVC, or AVS). The basic processing units can have variable sizes in a picture, such as 128×128, 64×64, 32×32, 16×16, 4×8, 16×32, or any arbitrary shape and size of pixels. The sizes and shapes of the basic processing units can be selected for a picture based on the balance of coding efficiency and levels of details to be kept in the basic processing unit.

The basic processing units can be logical units, which can include a group of different types of video data stored in a computer memory (e.g., in a video frame buffer). For example, a basic processing unit of a color picture can include a luma component (Y) representing achromatic brightness information, one or more chroma components (e.g., Cb and Cr) representing color information, and associated syntax elements, in which the luma and chroma components can have the same size of the basic processing unit. The luma and chroma components can be referred to as "coding tree blocks" ("CTBs") in some video coding standards (e.g., H.265/HEVC, H.266/VVC or AVS). Any operation performed to a basic processing unit can be repeatedly performed to each of its luma and chroma components.

Video coding has multiple stages of operations, examples of which are shown in FIGS. 2A-2B and FIGS. 3A-3B. For each stage, the size of the basic processing units can still be too large for processing, and thus can be further divided into segments referred to as "basic processing sub-units" in the present disclosure. In some embodiments, the basic processing sub-units can be referred to as "blocks" in some video coding standards (e.g., MPEG family, H.261, H.263, H.264/AVC, or AVS), or as "coding units" ("CUs") in some other video coding standards (e.g., H.265/HEVC, H.266/VVC, or AVS). A basic processing sub-unit can have the same or smaller size than the basic processing unit. Similar to the basic processing units, basic processing sub-units are also logical units, which can include a group of different types of video data (e.g., Y, Cb, Cr, and associated syntax elements) stored in a computer memory (e.g., in a video frame buffer). Any operation performed to a basic processing sub-unit can be repeatedly performed to each of its luma and chroma components. It should be noted that such division can be performed to further levels depending on processing needs. It should also be noted that different stages can divide the basic processing units using different schemes.

Figure 2A:
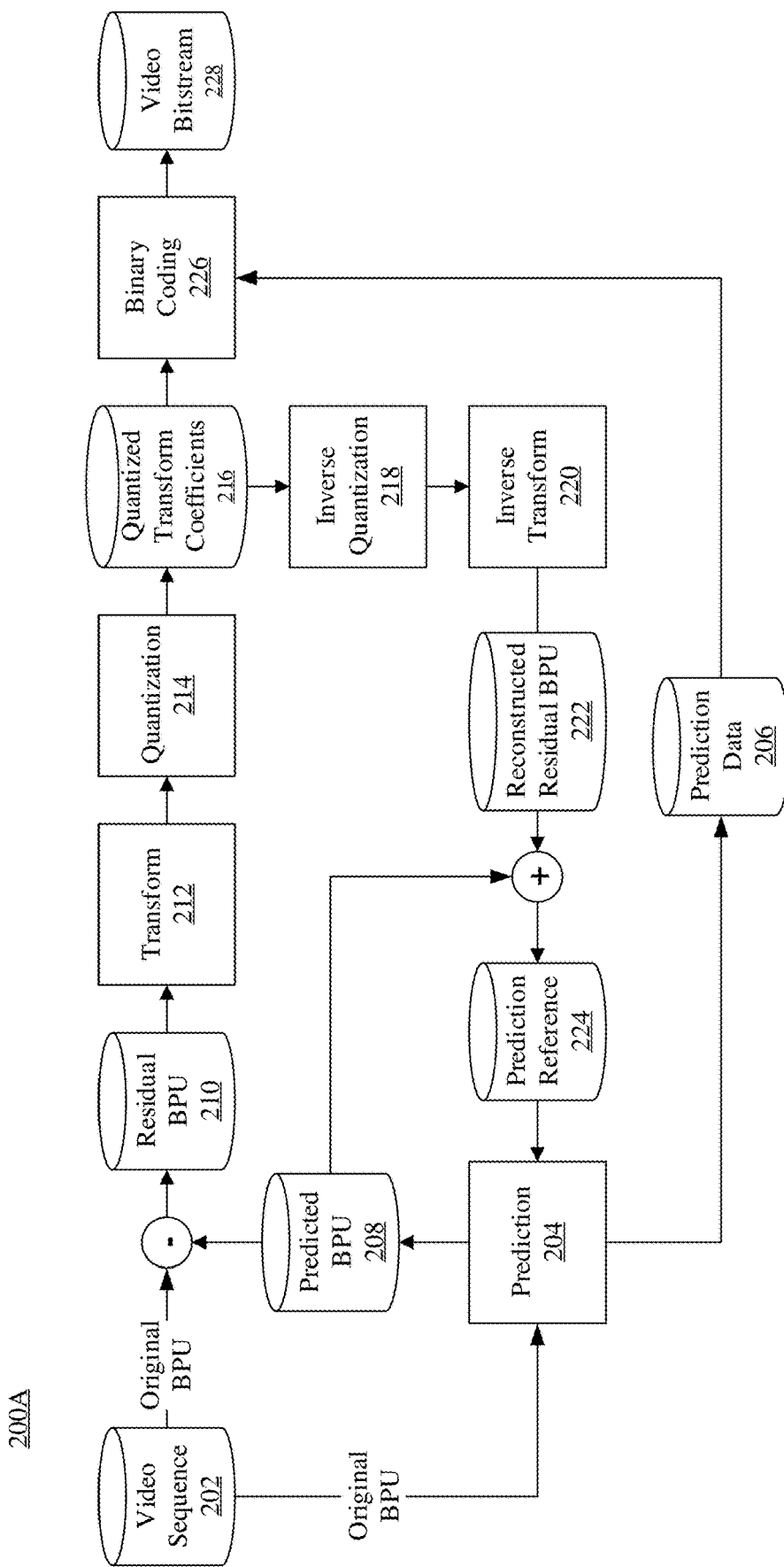
FIG. 2A is a schematic diagram illustrating an exemplary encoding process of a hybrid video coding system, according to some embodiments of the present disclosure.
Figure 2B:
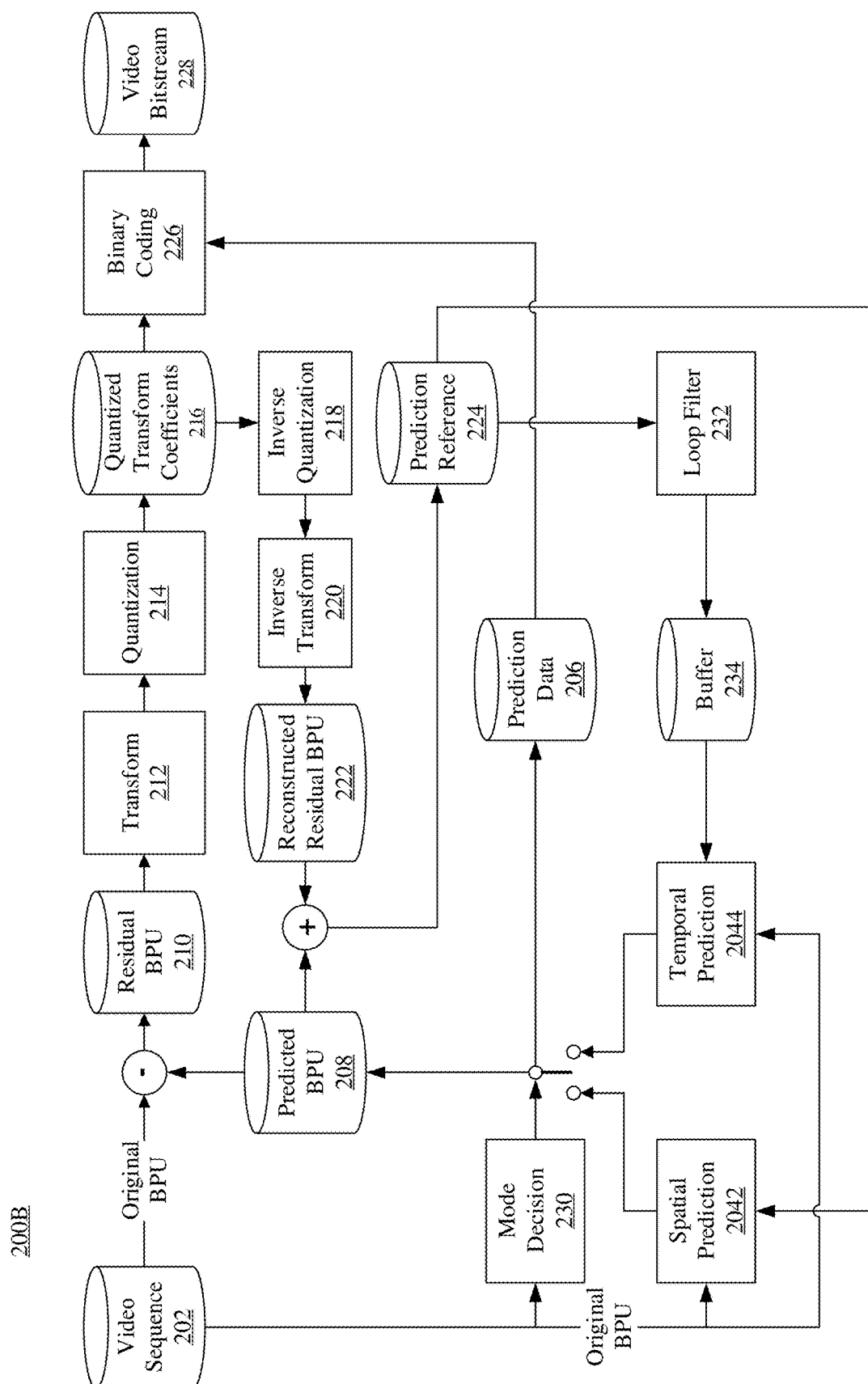
FIG. 2B is a schematic diagram illustrating another exemplary encoding process of a hybrid video coding system, according to some embodiments of the present disclosure.

For example, at a mode decision stage (an example of which is shown in FIG. 2B), the encoder can decide what prediction mode (e.g., intra-picture prediction or inter-picture prediction) to use for a basic processing unit, which can be too large to make such a decision. The encoder can split the basic processing unit into multiple basic processing sub-units (e.g., CUs as in H.265/HEVC, H.266/VVC, or AVS), and decide a prediction type for each individual basic processing sub-unit.

For another example, at a prediction stage (an example of which is shown in FIGS. 2A-2B), the encoder can perform prediction operation at the level of basic processing sub-units (e.g., CUs). However, in some cases, a basic processing sub-unit can still be too large to process. The encoder can further split the basic processing sub-unit into smaller segments (e.g., referred to as "prediction blocks" or "PBs" in H.265/HEVC, H.266/VVC, or AVS), at the level of which the prediction operation can be performed.

For another example, at a transform stage (an example of which is shown in FIGS. 2A-2B), the encoder can perform a transform operation for residual basic processing sub-units (e.g., CUs). However, in some cases, a basic processing sub-unit can still be too large to process. The encoder can further split the basic processing sub-unit into smaller segments (e.g., referred to as "transform blocks" or "TBs" in H.265/HEVC, H.266/VVC, or AVS), at the level of which the transform operation can be performed. It should be noted that the division schemes of the same basic processing sub-unit can be different at the prediction stage and the transform stage. For example, in H.265/HEVC, H.266/VVC, or AVS, the prediction blocks and transform blocks of the same CU can have different sizes and numbers.

In structure 110 of FIG. 1, basic processing unit 112 is further divided into 3×3 basic processing sub-units, the boundaries of which are shown as dotted lines. Different basic processing units of the same picture can be divided into basic processing sub-units in different schemes.

In some implementations, to provide the capability of parallel processing and error resilience to video encoding and decoding, a picture can be divided into regions for processing, such that, for a region of the picture, the encoding or decoding process can depend on no information from any other region of the picture. In other words, each region of the picture can be processed independently. By doing so, the codec can process different regions of a picture in parallel, thus increasing the coding efficiency. Also, when data of a region is corrupted in the processing or lost in network transmission, the codec can correctly encode or decode other regions of the same picture without reliance on the corrupted or lost data, thus providing the capability of error resilience. In some video coding standards, a picture can be divided into different types of regions. For example, H.265/HEVC, H.266/VVC and AVS provide two types of regions: "slices" and "tiles." It should also be noted that different pictures of video sequence 100 can have different partition schemes for dividing a picture into regions.

For example, in FIG. 1, structure 110 is divided into three regions 114, 116, and 118, the boundaries of which are shown as solid lines inside structure 110. Region 114 includes four basic processing units. Each of regions 116 and 118 includes six basic processing units. It should be noted that the basic processing units, basic processing sub-units, and regions of structure 110 in FIG. 1 are only examples, and the present disclosure does not limit embodiments thereof.

FIG. 2A illustrates a schematic diagram of an example encoding process 200A, consistent with embodiments of the disclosure. For example, the encoding process 200A can be performed by an encoder. As shown in FIG. 2A, the encoder can encode video sequence 202 into video bitstream 228 according to process 200A. Similar to video sequence 100 in FIG. 1, video sequence 202 can include a set of pictures (referred to as "original pictures") arranged in a temporal order. Similar to structure 110 in FIG. 1, each original picture of video sequence 202 can be divided by the encoder into basic processing units, basic processing sub-units, or regions for processing. In some embodiments, the encoder can perform process 200A at the level of basic processing units for each original picture of video sequence 202. For example, the encoder can perform process 200A in an iterative manner, in which the encoder can encode a basic processing unit in one iteration of process 200A. In some embodiments, the encoder can perform process 200A in parallel for regions (e.g., regions 114-118) of each original picture of video sequence 202.

In FIG. 2A, the encoder can feed a basic processing unit (referred to as an "original BPU") of an original picture of video sequence 202 to prediction stage 204 to generate prediction data 206 and predicted BPU 208. The encoder can subtract predicted BPU 208 from the original BPU to generate residual BPU 210. The encoder can feed residual BPU 210 to transform stage 212 and quantization stage 214 to generate quantized transform coefficients 216. The encoder can feed prediction data 206 and quantized transform coefficients 216 to binary coding stage 226 to generate video bitstream 228. Components 202, 204, 206, 208, 210, 212, 214, 216, 226, and 228 can be referred to as a "forward path." During process 200A, after quantization stage 214, the encoder can feed quantized transform coefficients 216 to inverse quantization stage 218 and inverse transform stage 220 to generate reconstructed residual BPU 222. The encoder can add reconstructed residual BPU 222 to predicted BPU 208 to generate prediction reference 224, which is used in prediction stage 204 for the next iteration of process 200A. Components 218, 220, 222, and 224 of process 200A can be referred to as a "reconstruction path." The reconstruction path can be used to ensure that both the encoder and the decoder use the same reference data for prediction.

The encoder can perform process 200A iteratively to encode each original BPU of the original picture (in the forward path) and generate predicted reference 224 for encoding the next original BPU of the original picture (in the reconstruction path). After encoding all original BPUs of the original picture, the encoder can proceed to encode the next picture in video sequence 202.

Referring to process 200A, the encoder can receive video sequence 202 generated by a video capturing device (e.g., a camera). The term "receive" used herein can refer to receiving, inputting, acquiring, retrieving, obtaining, reading, accessing, or any action in any manner for inputting data.

At prediction stage 204, at a current iteration, the encoder can receive an original BPU and prediction reference 224, and perform a prediction operation to generate prediction data 206 and predicted BPU 208. Prediction reference 224 can be generated from the reconstruction path of the previous iteration of process 200A. The purpose of prediction stage 204 is to reduce information redundancy by extracting prediction data 206 that can be used to reconstruct the original BPU as predicted BPU 208 from prediction data 206 and prediction reference 224.

Ideally, predicted BPU 208 can be identical to the original BPU. However, due to non-ideal prediction and reconstruction operations, predicted BPU 208 is generally slightly different from the original BPU. For recording such differences, after generating predicted BPU 208, the encoder can subtract it from the original BPU to generate residual BPU 210. For example, the encoder can subtract values (e.g., greyscale values or RGB values) of pixels of predicted BPU 208 from values of corresponding pixels of the original BPU. Each pixel of residual BPU 210 can have a residual value as a result of such subtraction between the corresponding pixels of the original BPU and predicted BPU 208. Compared with the original BPU, prediction data 206 and residual BPU 210 can have fewer bits, but they can be used to reconstruct the original BPU without significant quality deterioration. Thus, the original BPU is compressed.

To further compress residual BPU 210, at transform stage 212, the encoder can reduce spatial redundancy of residual BPU 210 by decomposing it into a set of two-dimensional "base patterns," each base pattern being associated with a "transform coefficient." The base patterns can have the same size (e.g., the size of residual BPU 210). Each base pattern can represent a variation frequency (e.g., frequency of brightness variation) component of residual BPU 210. None of the base patterns can be reproduced from any combinations (e.g., linear combinations) of any other base patterns. In other words, the decomposition can decompose variations of residual BPU 210 into a frequency domain. Such a decomposition is analogous to a discrete Fourier transform of a function, in which the base patterns are analogous to the base functions (e.g., trigonometry functions) of the discrete Fourier transform, and the transform coefficients are analogous to the coefficients associated with the base functions.

Different transform algorithms can use different base patterns. Various transform algorithms can be used at transform stage 212, such as, for example, a discrete cosine transform, a discrete sine transform, or the like. The transform at transform stage 212 is invertible. That is, the encoder can restore residual BPU 210 by an inverse operation of the transform (referred to as an "inverse transform"). For example, to restore a pixel of residual BPU 210, the inverse transform can be multiplying values of corresponding pixels of the base patterns by respective associated coefficients and adding the products to produce a weighted sum. For a video coding standard, both the encoder and decoder can use the same transform algorithm (thus the same base patterns). Thus, the encoder can record only the transform coefficients, from which the decoder can reconstruct residual BPU 210 without receiving the base patterns from the encoder. Compared with residual BPU 210, the transform coefficients can have fewer bits, but they can be used to reconstruct residual BPU 210 without significant quality deterioration. Thus, residual BPU 210 is further compressed.

The encoder can further compress the transform coefficients at quantization stage 214. In the transform process, different base patterns can represent different variation frequencies (e.g., brightness variation frequencies). Because human eyes are generally better at recognizing low-frequency variation, the encoder can disregard information of high-frequency variation without causing significant quality deterioration in decoding. For example, at quantization stage 214, the encoder can generate quantized transform coefficients 216 by dividing each transform coefficient by an integer value (referred to as a "quantization scale factor") and rounding the quotient to its nearest integer. After such an operation, some transform coefficients of the high-frequency base patterns can be converted to zero, and the transform coefficients of the low-frequency base patterns can be converted to smaller integers. The encoder can disregard the zero-value quantized transform coefficients 216, by which the transform coefficients are further compressed. The quantization process is also invertible, in which quantized transform coefficients 216 can be reconstructed to the transform coefficients in an inverse operation of the quantization (referred to as "inverse quantization").

Because the encoder disregards the remainders of such divisions in the rounding operation, quantization stage 214 can be lossy. Typically, quantization stage 214 can contribute the most information loss in process 200A. The larger the information loss is, the fewer bits the quantized transform coefficients 216 can need. For obtaining different levels of information loss, the encoder can use different values of the quantization parameter or any other parameter of the quantization process.

At binary coding stage 226, the encoder can encode prediction data 206 and quantized transform coefficients 216 using a binary coding technique, such as, for example, entropy coding, variable length coding, arithmetic coding, Huffman coding, context-adaptive binary arithmetic coding, or any other lossless or lossy compression algorithm. In some embodiments, besides prediction data 206 and quantized transform coefficients 216, the encoder can encode other information at binary coding stage 226, such as, for example, a prediction mode used at prediction stage 204, parameters of the prediction operation, a transform type at transform stage 212, parameters of the quantization process (e.g., quantization parameters), an encoder control parameter (e.g., a bitrate control parameter), or the like. The encoder can use the output data of binary coding stage 226 to generate video bitstream 228. In some embodiments, video bitstream 228 can be further packetized for network transmission.

Referring to the reconstruction path of process 200A, at inverse quantization stage 218, the encoder can perform inverse quantization on quantized transform coefficients 216 to generate reconstructed transform coefficients. At inverse transform stage 220, the encoder can generate reconstructed residual BPU 222 based on the reconstructed transform coefficients. The encoder can add reconstructed residual BPU 222 to predicted BPU 208 to generate prediction reference 224 that is to be used in the next iteration of process 200A.

It should be noted that other variations of the process 200A can be used to encode video sequence 202. In some embodiments, stages of process 200A can be performed by the encoder in different orders. In some embodiments, one or more stages of process 200A can be combined into a single stage. In some embodiments, a single stage of process 200A can be divided into multiple stages. For example, transform stage 212 and quantization stage 214 can be combined into a single stage. In some embodiments, process 200A can include additional stages. In some embodiments, process 200A can omit one or more stages in FIG. 2A.

FIG. 2B illustrates a schematic diagram of another example encoding process 200B, consistent with embodiments of the disclosure. Process 200B can be modified from process 200A. For example, process 200B can be used by an encoder conforming to a hybrid video coding standard (e.g., H.26x series). Compared with process 200A, the forward path of process 200B additionally includes mode decision stage 230 and divides prediction stage 204 into spatial prediction stage 2042 and temporal prediction stage 2044. The reconstruction path of process 200B additionally includes loop filter stage 232 and buffer 234.

Generally, prediction techniques can be categorized into two types: spatial prediction and temporal prediction. Spatial prediction (e.g., an intra-picture prediction or "intra prediction") can use pixels from one or more already coded neighboring BPUs in the same picture to predict the current BPU. That is, prediction reference 224 in the spatial prediction can include the neighboring BPUs. The spatial prediction can reduce the inherent spatial redundancy of the picture. Temporal prediction (e.g., an inter-picture prediction or "inter prediction") can use regions from one or more already coded pictures to predict the current BPU. That is, prediction reference 224 in the temporal prediction can include the coded pictures. The temporal prediction can reduce the inherent temporal redundancy of the pictures.

Referring to process 200B, in the forward path, the encoder performs the prediction operation at spatial prediction stage 2042 and temporal prediction stage 2044. For example, at spatial prediction stage 2042, the encoder can perform the intra prediction. For an original BPU of a picture being encoded, prediction reference 224 can include one or more neighboring BPUs that have been encoded (in the forward path) and reconstructed (in the reconstructed path) in the same picture. The encoder can generate predicted BPU 208 by extrapolating the neighboring BPUs. The extrapolation technique can include, for example, a linear extrapolation or interpolation, a polynomial extrapolation or interpolation, or the like. In some embodiments, the encoder can perform the extrapolation at the pixel level, such as by extrapolating values of corresponding pixels for each pixel of predicted BPU 208. The neighboring BPUs used for extrapolation can be located with respect to the original BPU from various directions, such as in a vertical direction (e.g., on top of the original BPU), a horizontal direction (e.g., to the left of the original BPU), a diagonal direction (e.g., to the down-left, down-right, up-left, or up-right of the original BPU), or any direction defined in the used video coding standard. For the intra prediction, prediction data 206 can include, for example, locations (e.g., coordinates) of the used neighboring BPUs, sizes of the used neighboring BPUs, parameters of the extrapolation, a direction of the used neighboring BPUs with respect to the original BPU, or the like.

For another example, at temporal prediction stage 2044, the encoder can perform the inter prediction. For an original BPU of a current picture, prediction reference 224 can include one or more pictures (referred to as "reference pictures") that have been encoded (in the forward path) and reconstructed (in the reconstructed path). In some embodiments, a reference picture can be encoded and reconstructed BPU by BPU. For example, the encoder can add reconstructed residual BPU 222 to predicted BPU 208 to generate a reconstructed BPU. When all reconstructed BPUs of the same picture are generated, the encoder can generate a reconstructed picture as a reference picture. The encoder can perform an operation of "motion estimation" to search for a matching region in a scope (referred to as a "search window") of the reference picture. The location of the search window in the reference picture can be determined based on the location of the original BPU in the current picture. For example, the search window can be centered at a location having the same coordinates in the reference picture as the original BPU in the current picture and can be extended out for a predetermined distance. When the encoder identifies (e.g., by using a pel-recursive algorithm, a block-matching algorithm, or the like) a region similar to the original BPU in the search window, the encoder can determine such a region as the matching region. The matching region can have different dimensions (e.g., being smaller than, equal to, larger than, or in a different shape) from the original BPU. Because the reference picture and the current picture are temporally separated in the timeline (e.g., as shown in FIG. 1), it can be deemed that the matching region "moves" to the location of the original BPU as time goes by. The encoder can record the direction and distance of such a motion as a "motion vector." When multiple reference pictures are used (e.g., as picture 106 in FIG. 1), the encoder can search for a matching region and determine its associated motion vector for each reference picture. In some embodiments, the encoder can assign weights to pixel values of the matching regions of respective matching reference pictures.

The motion estimation can be used to identify various types of motions, such as, for example, translations, rotations, zooming, or the like. For inter prediction, prediction data 206 can include, for example, locations (e.g., coordinates) of the matching region, the motion vectors associated with the matching region, the number of reference pictures, weights associated with the reference pictures, or the like.

For generating predicted BPU 208, the encoder can perform an operation of "motion compensation." The motion compensation can be used to reconstruct predicted BPU 208 based on prediction data 206 (e.g., the motion vector) and prediction reference 224. For example, the encoder can move the matching region of the reference picture according to the motion vector, in which the encoder can predict the original BPU of the current picture. When multiple reference pictures are used (e.g., as picture 106 in FIG. 1), the encoder can move the matching regions of the reference pictures according to the respective motion vectors and average pixel values of the matching regions. In some embodiments, if the encoder has assigned weights to pixel values of the matching regions of respective matching reference pictures, the encoder can add a weighted sum of the pixel values of the moved matching regions.

In some embodiments, the inter prediction can be unidirectional or bidirectional. Unidirectional inter predictions can use one or more reference pictures in the same temporal direction with respect to the current picture. For example, picture 104 in FIG. 1 is a unidirectional inter-predicted picture, in which the reference picture (e.g., picture 102) precedes picture 104. Bidirectional inter predictions can use one or more reference pictures at both temporal directions with respect to the current picture. For example, picture 106 in FIG. 1 is a bidirectional inter-predicted picture, in which the reference pictures (e.g., pictures 104 and 108) are at both temporal directions with respect to picture 104.

Still referring to the forward path of process 200B, after spatial prediction 2042 and temporal prediction stage 2044, at mode decision stage 230, the encoder can select a prediction mode (e.g., one of the intra prediction or the inter prediction) for the current iteration of process 200B. For example, the encoder can perform a rate-distortion optimization technique, in which the encoder can select a prediction mode to minimize a value of a cost function depending on a bit rate of a candidate prediction mode and distortion of the reconstructed reference picture under the candidate prediction mode. Depending on the selected prediction mode, the encoder can generate the corresponding predicted BPU 208 and predicted data 206.

In the reconstruction path of process 200B, if intra prediction mode has been selected in the forward path, after generating prediction reference 224 (e.g., the current BPU that has been encoded and reconstructed in the current picture), the encoder can directly feed prediction reference 224 to spatial prediction stage 2042 for later usage (e.g., for extrapolation of a next BPU of the current picture). The encoder can feed prediction reference 224 to loop filter stage 232, at which the encoder can apply a loop filter to prediction reference 224 to reduce or eliminate distortion (e.g., blocking artifacts) introduced during coding of the prediction reference 224. The encoder can apply various loop filter techniques at loop filter stage 232, such as, for example, deblocking, sample adaptive offsets, adaptive loop filters, or the like. The loop-filtered reference picture can be stored in buffer 234 (or "decoded picture buffer") for later use (e.g., to be used as an inter-prediction reference picture for a future picture of video sequence 202). The encoder can store one or more reference pictures in buffer 234 to be used at temporal prediction stage 2044. In some embodiments, the encoder can encode parameters of the loop filter (e.g., a loop filter strength) at binary coding stage 226, along with quantized transform coefficients 216, prediction data 206, and other information.

Figure 3A:
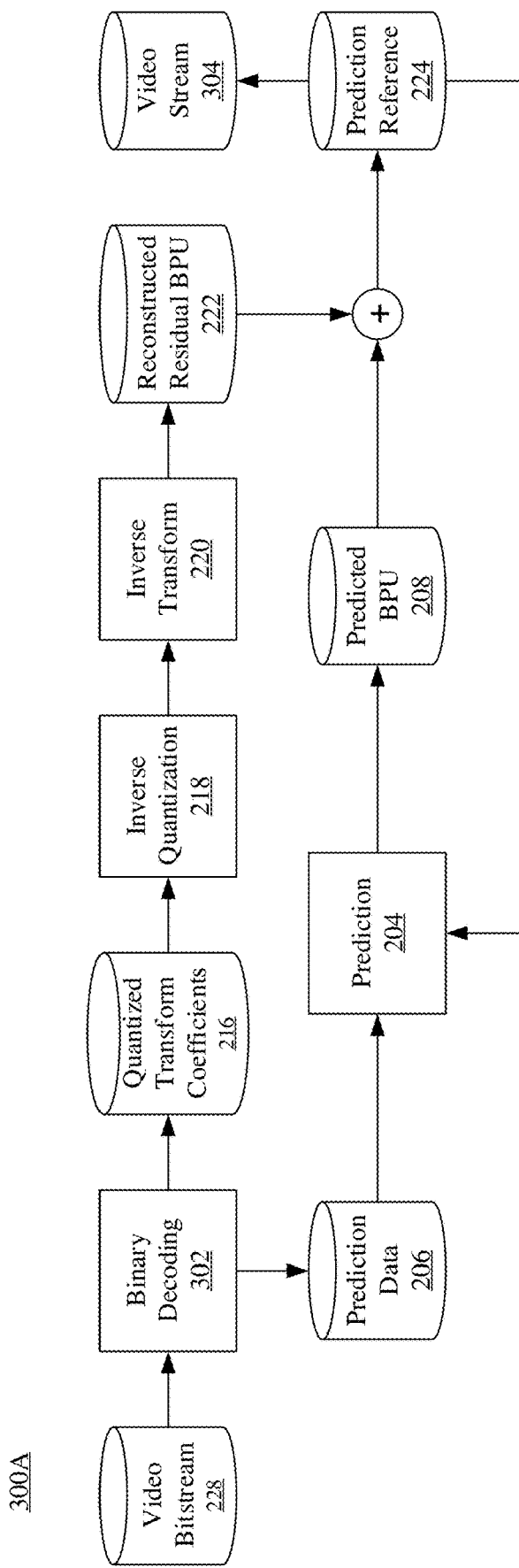
FIG. 3A is a schematic diagram illustrating an exemplary decoding process of a hybrid video coding system, according to some embodiments of the present disclosure.

FIG. 3A illustrates a schematic diagram of an example decoding process 300A, consistent with embodiments of the disclosure. Process 300A can be a decompression process corresponding to the compression process 200A in FIG. 2A. In some embodiments, process 300A can be similar to the reconstruction path of process 200A. A decoder can decode video bitstream 228 into video stream 304 according to process 300A. Video stream 304 can be very similar to video sequence 202. However, due to the information loss in the compression and decompression process (e.g., quantization stage 214 in FIGS. 2A-2B), generally, video stream 304 is not identical to video sequence 202. Similar to processes 200A and 200B in FIGS. 2A-2B, the decoder can perform process 300A at the level of basic processing units (BPUs) for each picture encoded in video bitstream 228. For example, the decoder can perform process 300A in an iterative manner, in which the decoder can decode a basic processing unit in one iteration of process 300A. In some embodiments, the decoder can perform process 300A in parallel for regions (e.g., regions 114-118) of each picture encoded in video bitstream 228.

In FIG. 3A, the decoder can feed a portion of video bitstream 228 associated with a basic processing unit (referred to as an "encoded BPU") of an encoded picture to binary decoding stage 302. At binary decoding stage 302, the decoder can decode the portion into prediction data 206 and quantized transform coefficients 216. The decoder can feed quantized transform coefficients 216 to inverse quantization stage 218 and inverse transform stage 220 to generate reconstructed residual BPU 222. The decoder can feed prediction data 206 to prediction stage 204 to generate predicted BPU 208. The decoder can add reconstructed residual BPU 222 to predicted BPU 208 to generate predicted reference 224. In some embodiments, predicted reference 224 can be stored in a buffer (e.g., a decoded picture buffer in a computer memory). The decoder can feed predicted reference 224 to prediction stage 204 for performing a prediction operation in the next iteration of process 300A.

The decoder can perform process 300A iteratively to decode each encoded BPU of the encoded picture and generate predicted reference 224 for encoding the next encoded BPU of the encoded picture. After decoding all encoded BPUs of the encoded picture, the decoder can output the picture to video stream 304 for display and proceed to decode the next encoded picture in video bitstream 228.

At binary decoding stage 302, the decoder can perform an inverse operation of the binary coding technique used by the encoder (e.g., entropy coding, variable length coding, arithmetic coding, Huffman coding, context-adaptive binary arithmetic coding, or any other lossless compression algorithm). In some embodiments, besides prediction data 206 and quantized transform coefficients 216, the decoder can decode other information at binary decoding stage 302, such as, for example, a prediction mode, parameters of the prediction operation, a transform type, parameters of the quantization process (e.g., quantization parameters), an encoder control parameter (e.g., a bitrate control parameter), or the like. In some embodiments, if video bitstream 228 is transmitted over a network in packets, the decoder can depacketize video bitstream 228 before feeding it to binary decoding stage 302.

Figure 3B:
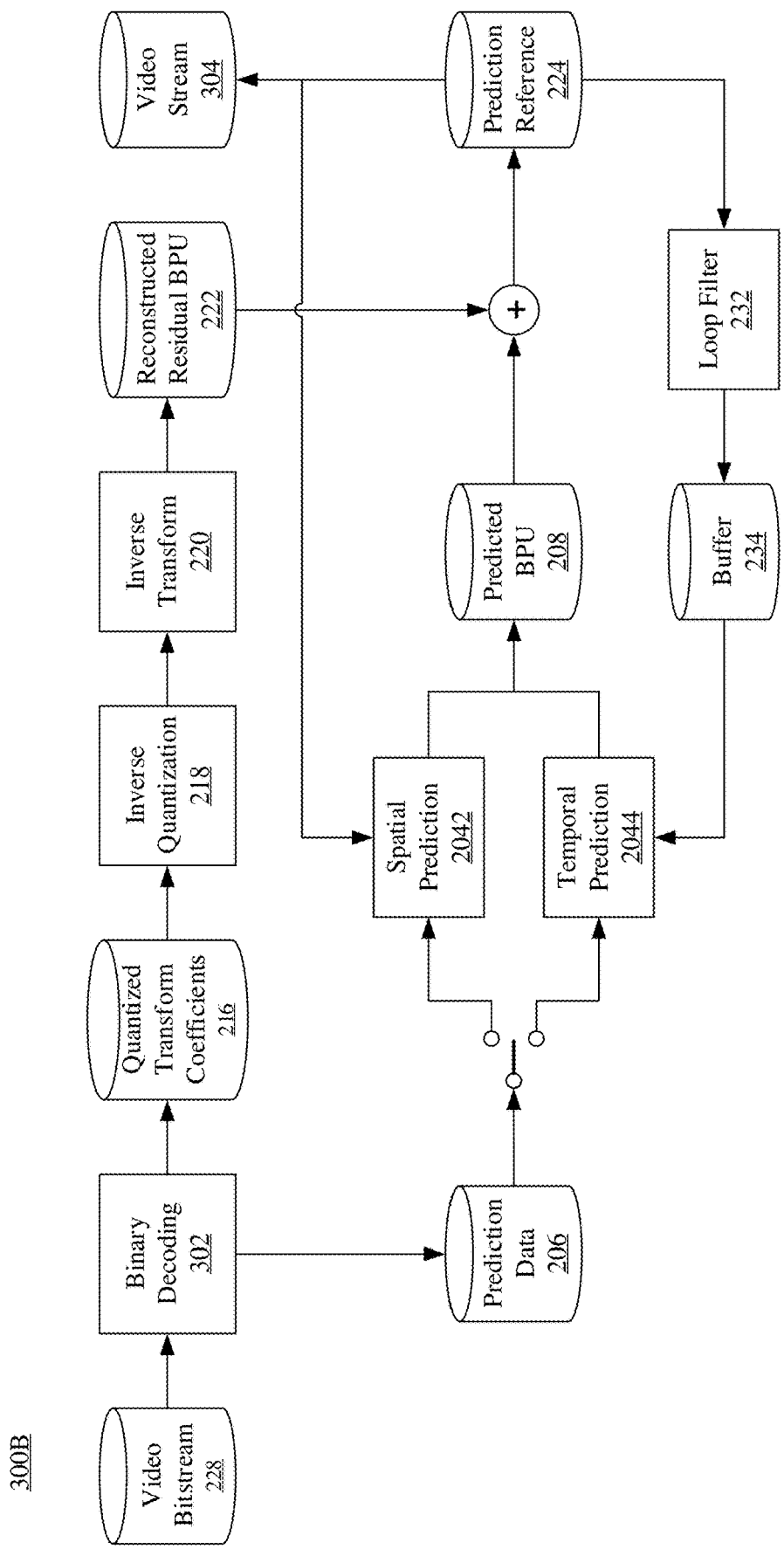
FIG. 3B is a schematic diagram illustrating another exemplary decoding process of a hybrid video coding system, according to some embodiments of the present disclosure.

FIG. 3B illustrates a schematic diagram of another example decoding process 300B, consistent with embodiments of the disclosure. Process 300B can be modified from process 300A. For example, process 300B can be used by a decoder conforming to a hybrid video coding standard (e.g., H.26x series). Compared with process 300A, process 300B additionally divides prediction stage 204 into spatial prediction stage 2042 and temporal prediction stage 2044, and additionally includes loop filter stage 232 and buffer 234.

In process 300B, for an encoded basic processing unit (referred to as a "current BPU") of an encoded picture (referred to as a "current picture") that is being decoded, prediction data 206 decoded from binary decoding stage 302 by the decoder can include various types of data, depending on what prediction mode was used to encode the current BPU by the encoder. For example, if intra prediction was used by the encoder to encode the current BPU, prediction data 206 can include a prediction mode indicator (e.g., a flag value) indicative of the intra prediction, parameters of the intra prediction operation, or the like. The parameters of the intra prediction operation can include, for example, locations (e.g., coordinates) of one or more neighboring BPUs used as a reference, sizes of the neighboring BPUs, parameters of extrapolation, a direction of the neighboring BPUs with respect to the original BPU, or the like. For another example, if inter prediction was used by the encoder to encode the current BPU, prediction data 206 can include a prediction mode indicator (e.g., a flag value) indicative of the inter prediction, parameters of the inter prediction operation, or the like. The parameters of the inter prediction operation can include, for example, the number of reference pictures associated with the current BPU, weights respectively associated with the reference pictures, locations (e.g., coordinates) of one or more matching regions in the respective reference pictures, one or more motion vectors respectively associated with the matching regions, or the like.

Based on the prediction mode indicator, the decoder can decide whether to perform a spatial prediction (e.g., the intra prediction) at spatial prediction stage 2042 or a temporal prediction (e.g., the inter prediction) at temporal prediction stage 2044. The details of performing such spatial prediction or temporal prediction are described in FIG. 2B and will not be repeated hereinafter. After performing such spatial prediction or temporal prediction, the decoder can generate predicted BPU 208. The decoder can add predicted BPU 208 and reconstructed residual BPU 222 to generate prediction reference 224, as described in FIG. 3A.

In process 300B, the decoder can feed predicted reference 224 to spatial prediction stage 2042 or temporal prediction stage 2044 for performing a prediction operation in the next iteration of process 300B. For example, if the current BPU is decoded using the intra prediction at spatial prediction stage 2042, after generating prediction reference 224 (e.g., the decoded current BPU), the decoder can directly feed prediction reference 224 to spatial prediction stage 2042 for later usage (e.g., for extrapolation of a next BPU of the current picture). If the current BPU is decoded using the inter prediction at temporal prediction stage 2044, after generating prediction reference 224 (e.g., a reference picture in which all BPUs have been decoded), the decoder can feed prediction reference 224 to loop filter stage 232 to reduce or eliminate distortion (e.g., blocking artifacts). The decoder can apply a loop filter to prediction reference 224, in a way as described in FIG. 2B. The loop-filtered reference picture can be stored in buffer 234 (e.g., a decoded picture buffer in a computer memory) for later use (e.g., to be used as an inter-prediction reference picture for a future encoded picture of video bitstream 228). The decoder can store one or more reference pictures in buffer 234 to be used at temporal prediction stage 2044. In some embodiments, prediction data can further include parameters of the loop filter (e.g., a loop filter strength). In some embodiments, prediction data includes parameters of the loop filter when the prediction mode indicator of prediction data 206 indicates that inter prediction was used to encode the current BPU.

Figure 4:
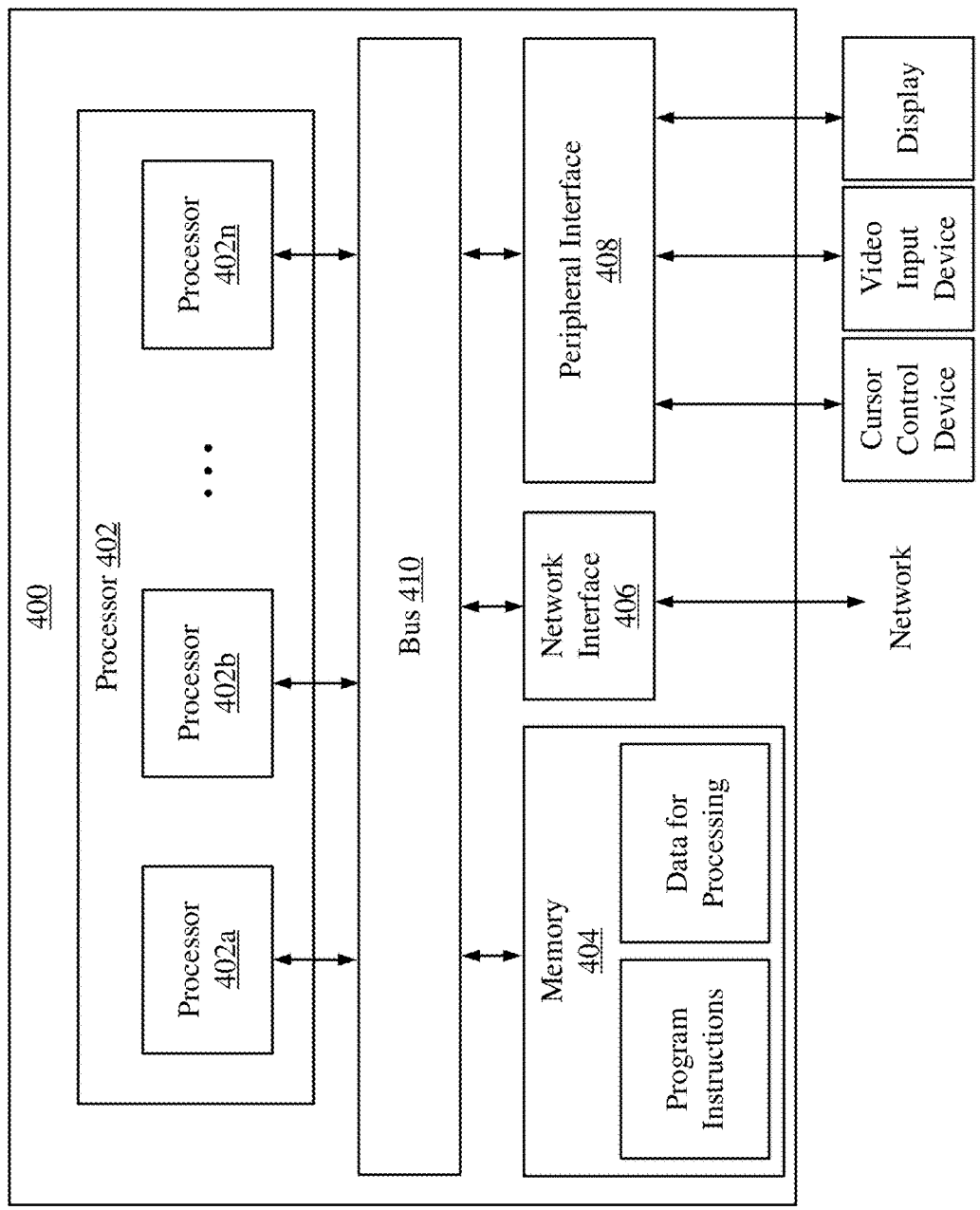
FIG. 4 is a block diagram of an exemplary apparatus for encoding or decoding a video, according to some embodiments of the present disclosure.

FIG. 4 is a block diagram of an example apparatus 400 for encoding or decoding a video, consistent with embodiments of the disclosure. As shown in FIG. 4, apparatus 400 can include processor 402. When processor 402 executes instructions described herein, apparatus 400 can become a specialized machine for video encoding or decoding. Processor 402 can be any type of circuitry capable of manipulating or processing information. For example, processor 402 can include any combination of any number of a central processing unit (or "CPU"), a graphics processing unit (or "GPU"), a neural processing unit ("NPU"), a microcontroller unit ("MCU"), an optical processor, a programmable logic controller, a microcontroller, a microprocessor, a digital signal processor, an intellectual property (IP) core, a Programmable Logic Array (PLA), a Programmable Array Logic (PAL), a Generic Array Logic (GAL), a Complex Programmable Logic Device (CPLD), a Field-Programmable Gate Array (FPGA), a System On Chip (SoC), an Application-Specific Integrated Circuit (ASIC), or the like. In some embodiments, processor 402 can also be a set of processors grouped as a single logical component. For example, as shown in FIG. 4, processor 402 can include multiple processors, including processor 402a, processor 402b, and processor 402n.

Apparatus 400 can also include memory 404 configured to store data (e.g., a set of instructions, computer codes, intermediate data, or the like). For example, as shown in FIG. 4, the stored data can include program instructions (e.g., program instructions for implementing the stages in processes 200A, 200B, 300A, or 300B) and data for processing (e.g., video sequence 202, video bitstream 228, or video stream 304). Processor 402 can access the program instructions and data for processing (e.g., via bus 410), and execute the program instructions to perform an operation or manipulation on the data for processing. Memory 404 can include a high-speed random-access storage device or a non-volatile storage device. In some embodiments, memory 404 can include any combination of any number of a random-access memory (RAM), a read-only memory (ROM), an optical disc, a magnetic disk, a hard drive, a solid-state drive, a flash drive, a security digital (SD) card, a memory stick, a compact flash (CF) card, or the like. Memory 404 can also be a group of memories (not shown in FIG. 4) grouped as a single logical component.

Bus 410 can be a communication device that transfers data between components inside apparatus 400, such as an internal bus (e.g., a CPU-memory bus), an external bus (e.g., a universal serial bus port, a peripheral component interconnect express port), or the like.

For ease of explanation without causing ambiguity, processor 402 and other data processing circuits are collectively referred to as a "data processing circuit" in this disclosure. The data processing circuit can be implemented entirely as hardware, or as a combination of software, hardware, or firmware. In addition, the data processing circuit can be a single independent module or can be combined entirely or partially into any other component of apparatus 400.

Apparatus 400 can further include network interface 406 to provide wired or wireless communication with a network (e.g., the Internet, an intranet, a local area network, a mobile communications network, or the like). In some embodiments, network interface 406 can include any combination of any number of a network interface controller (NIC), a radio frequency (RF) module, a transponder, a transceiver, a modem, a router, a gateway, a wired network adapter, a wireless network adapter, a Bluetooth adapter, an infrared adapter, an near-field communication ("NFC") adapter, a cellular network chip, or the like.

In some embodiments, optionally, apparatus 400 can further include peripheral interface 408 to provide a connection to one or more peripheral devices. As shown in FIG. 4, the peripheral device can include, but is not limited to, a cursor control device (e.g., a mouse, a touchpad, or a touchscreen), a keyboard, a display (e.g., a cathode-ray tube display, a liquid crystal display, or a light-emitting diode display), a video input device (e.g., a camera or an input interface coupled to a video archive), or the like.

It should be noted that video codecs (e.g., a codec performing process 200A, 200B, 300A, or 300B) can be implemented as any combination of any software or hardware modules in apparatus 400. For example, some or all stages of process 200A, 200B, 300A, or 300B can be implemented as one or more software modules of apparatus 400, such as program instructions that can be loaded into memory 404. For another example, some or all stages of process 200A, 200B, 300A, or 300B can be implemented as one or more hardware modules of apparatus 400, such as a specialized data processing circuit (e.g., an FPGA, an ASIC, an NPU, or the like).

A Two-Step Cross-component Prediction Mode (TSCPM) for chroma intra coding is adopted in AVS3, which assumes a linear correlation between luma and chroma components.

TSCPM is performed in the following two steps: (1) A linear model is applied to a luma reconstructed block to get a temporary chroma prediction block; and (2) The temporary chroma prediction block is down-sampled to generate a final chroma prediction block.

Figure 5:
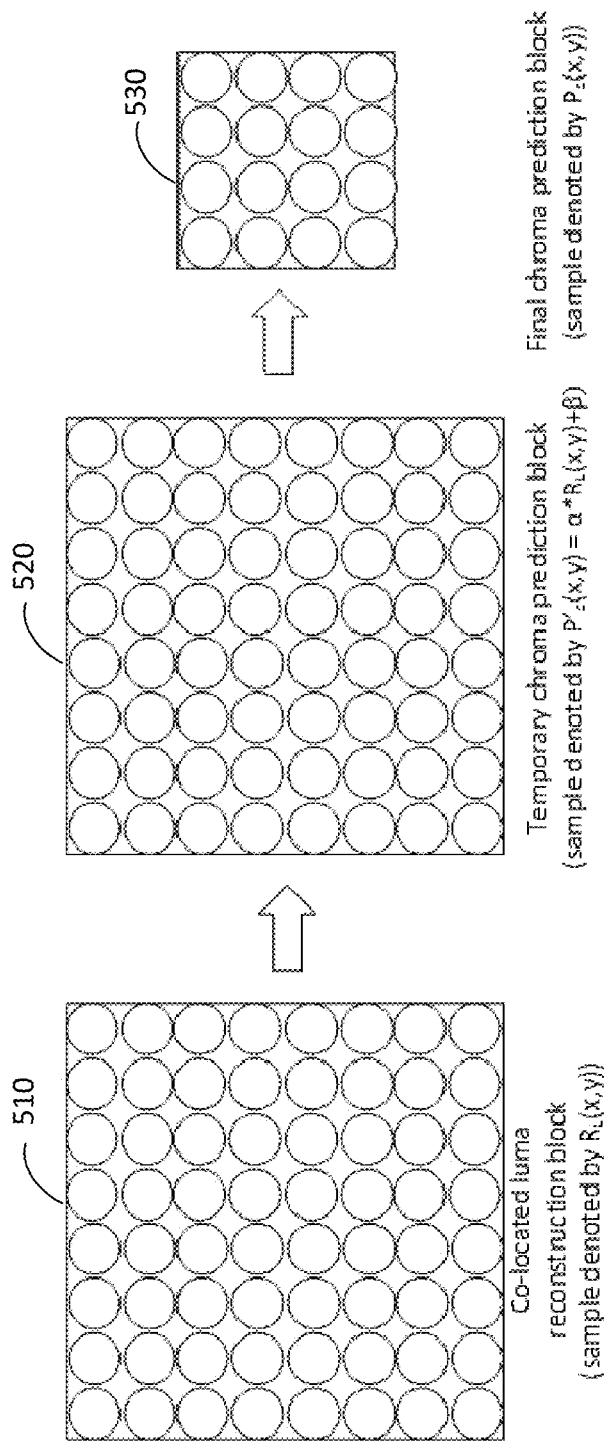
FIG. 5 is a schematic diagram illustrating exemplary a coding flow of a two step cross-component prediction mode (TSCPM), according to some embodiments of the present disclosure.

FIG. 5 is a schematic diagram illustrating an exemplary coding flow of TSCPM, according to some embodiments of the present disclosure. As shown in FIG. 5, a co-located luma reconstructed block 510 is the reconstructed luma sample located at (x, y) of the co-located luma block by $R_L(x, y)$. By simply applying a linear model with parameters ($\alpha$, $\beta$) to each luma sample, a temporary chroma prediction block 520 is generated. The temporary chroma prediction block 520 is further down-sampled to generate a final chroma prediction block 530.

The linear model parameters are obtained from reconstructed samples in the neighboring row and column. The neighboring row and column of the co-located luma reconstructed block 510 are first down-sampled to obtain the same size as the neighboring row and column of the chroma prediction block 530. Then, for different TSCPM modes, different pairs will be selected from the neighboring row or column of the co-located luma reconstructed block 510 and the chroma prediction block 530 to derive linear model parameters. Each pair includes a luma reconstructed sample in the down-sampled neighboring row and column of the co-located luma reconstructed block 510 and a chroma reconstructed sample in the neighboring row and column of the chroma prediction block 530.

Figure 6:
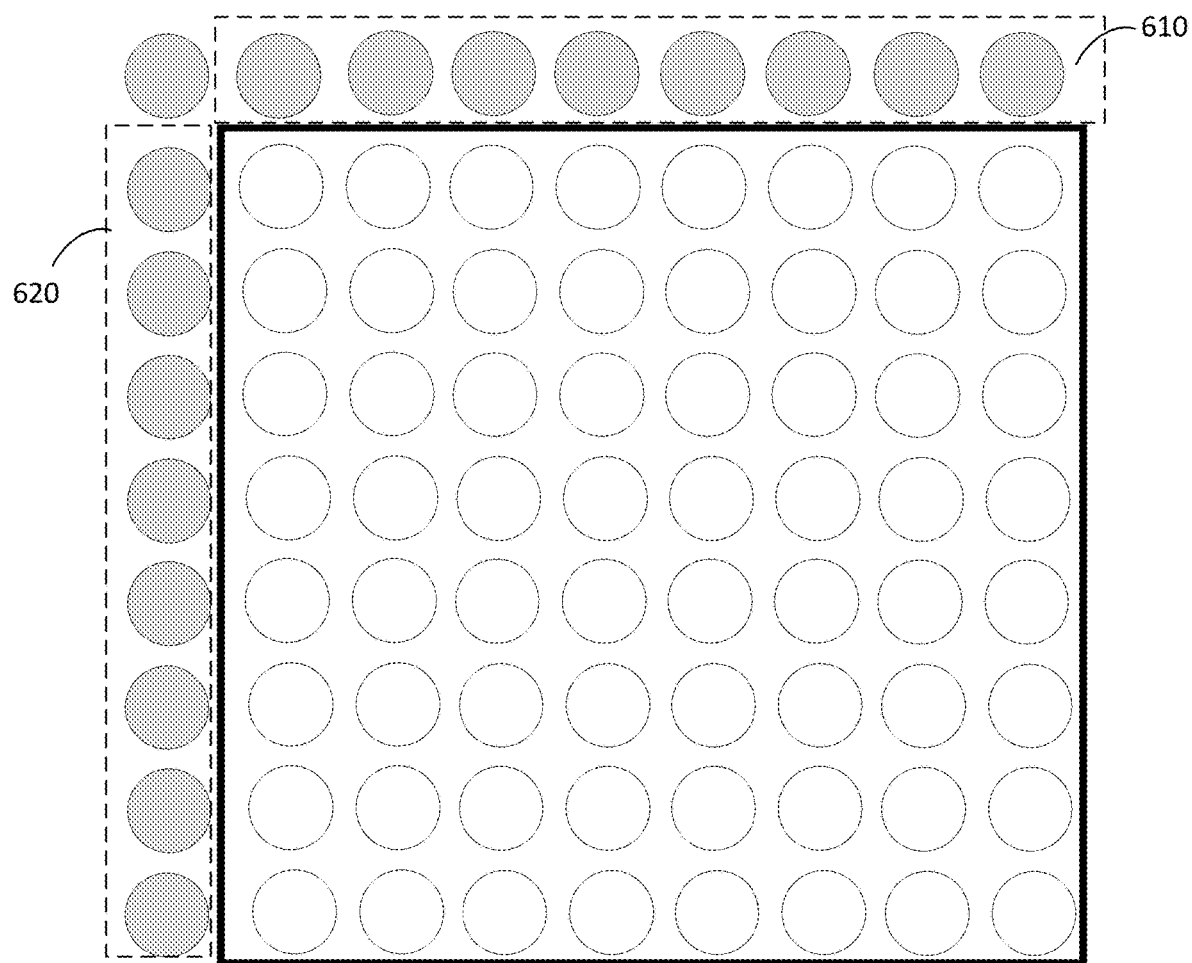
FIG. 6 is a schematic diagram illustrating an exemplary prediction block with top neighboring row and left neighboring column, according to some embodiments of the present disclosure.

There are 3 TSCPM modes in AVS3, such as TSCPM left-top mode (TSCPM_LT), TSCPM left mode (TSCPM_L) and TSCPM top mode (TSCPM_T). The difference between these three modes are the different pairs selected to derive the linear model parameters. FIG. 6 is a schematic diagram illustrating an exemplary prediction block with top neighboring row and left neighboring column, according to some embodiments of the present disclosure. As shown in FIG. 6, for a prediction block, row[1, . . . , W] (or denoted as row[0, . . . , W−1]) is used to represent the reconstructed pairs of the top neighboring row 610 and col[1, . . . , H](or denoted as col[0, . . . , H−1]) is used to represent the reconstructed pairs of the left neighboring column 620, where W and H are the width and height of the prediction block, respectively. In some embodiments, the prediction block is a current block. The selected pairs are as follows.

For TSCPM_LT mode: (1) if both row[1, . . . , W] and col[1, . . . , H] are available, and W is greater than or equal to H, the pairs at row[1], row[W−W/H+1], col[1] and col[H] are selected; (2) if both row[1, . . . , W] and col[1, . . . , H] are available, and W is less than H, the pairs at row[1], row[W], col[1] and col[H−H/W+1] are selected; (3) if only row[1, . . . , W] is available, the pairs at row[1], row[W/4+1], row[2W/4+1] and row[3W/4+1] are selected; and (4) if only col[1, . . . , H] is available, the pairs at col[1], col[H/4+1], col[2H/4+1] and col[3H/4+1] are selected.

For TSCPM_T mode: the pairs at row[1], row[W/4+1], row[2W/4+1] and row[3W/4+1] are selected.

For TSCPM_L mode: the pairs at col[1], col[H/4+1], col[2H/4+1] and col[3H/4+1] are selected.

It should be noted that if the block in which the sample is located "does not exist" or this sample has not been decoded, then this sample is "unavailable"; otherwise, this sample is "available".

The 4 selected pairs are sorted according to luma sample values and classified into two groups. Specifically, the two groups are determined based on the luma sample values. A first group includes two pairs with the two largest luma sample values and a second group includes two pairs with the two smallest luma sample values. $L_{max}$ is an average of the two largest luma sample values and $L_{min}$ is an average of the two smallest luma sample values. Similarly, $C_{max}$ and $C_{min}$ are averages of the corresponding chroma sample values. The linear model parameters $\alpha$ and $\beta$ are derived by the two averaged pairs ($L_{max}$, $C_{max}$) and ($L_{min}$, $C_{min}$) as shown in Eq. (1).

$$\alpha = \frac{C_{max} - C_{min}}{L_{max} - L_{min}}, \beta = C_{min} - \alpha L_{min} \quad Eq.(1)$$

where $L_{max}$ and $C_{max}$ are the averages of the two luma reconstructed samples, and two chrome reconstructed samples in the two larger pairs, $L_{min}$ and $C_{min}$ are the averages of the two luma reconstructed samples and two chrome reconstructed samples in the two smaller pairs.

The temporary chroma prediction block is generated based on Eq. (2). $P_c'(x, y)$ is the temporary chroma prediction block. $\alpha$ and $\beta$ are the two linear model parameters derived according to Eq. (1). $R_L(x, y)$ is the luma reconstructed block. Where (x, y) represents the coordinate position of the current sample related to the top left sample of the current block, the value range of x is 0 to 2W−1, and the value range of y is 0 to 2H−1.

$$P_c'(x, y) = \alpha \times R_L(x, y) + \beta \qquad \text{Eq. (2)}$$

Similar to a normal intra prediction process, a clipping operation is applied to $P_c'(x, y)$ to make sure $P_c'(x, y)$ is within [0, 1<<(BitDepth−1)].

Figure 7:
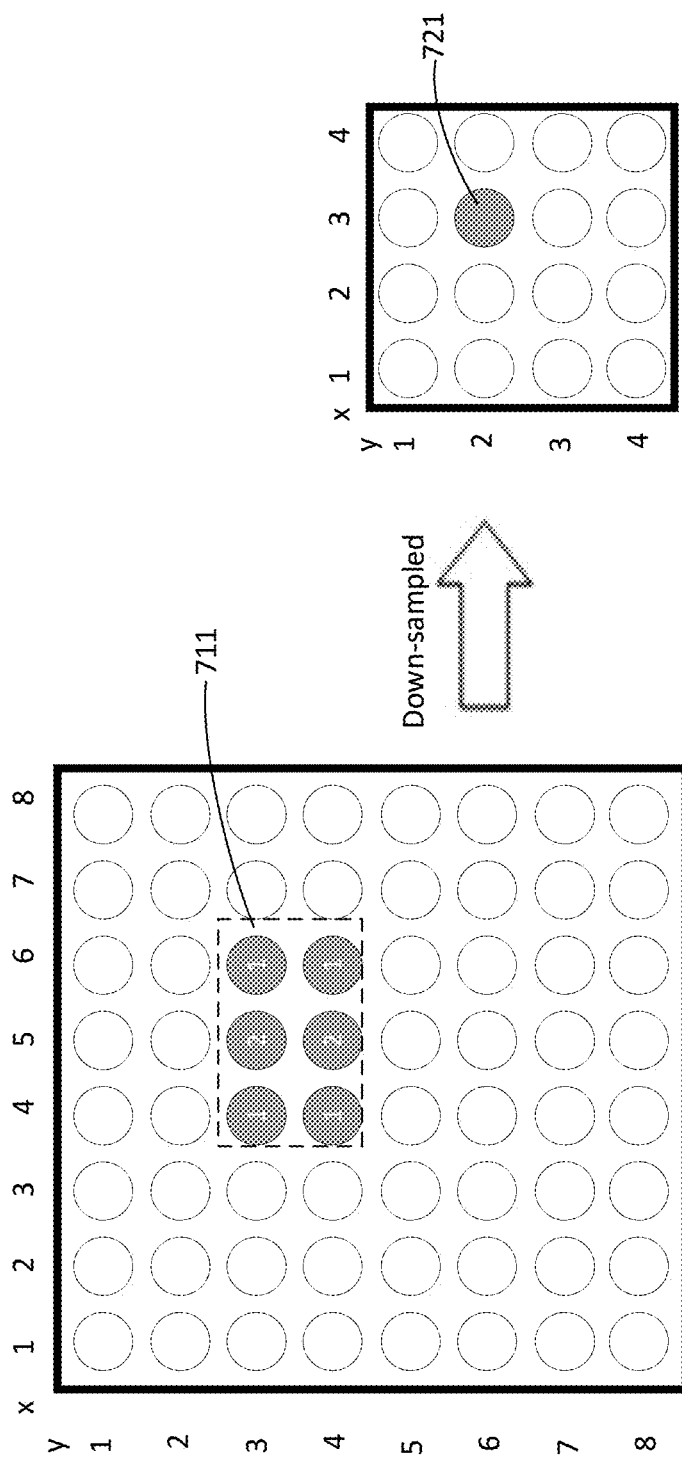
FIG. 7 is a schematic diagram illustrating an exemplary down-sampled process with a six-tap filter, according to some embodiments of the present disclosure.

FIG. 7 is a schematic diagram illustrating an exemplary down-sampled process with a six-tap filter, according to some embodiments of the present disclosure. As shown in FIG. 7, a six-tap filter $$\left(\text{e.g., filter} = \begin{pmatrix} 1 & 2 & 1 \\ 1 & 2 & 1 \end{pmatrix}\right)$$

is introduced for the down-sampled process for temporary chroma prediction block. The temporary chroma prediction block 710 with width and height of 2W and 2H is down-sampled by this filter into a final chroma prediction block 720 with width and height of W and H. In the final chroma prediction block 720, the predicted sample $P_c(x, y)$ 721, having coordinate position (x, y), can be obtained by 6 samples 711 in the temporary chroma prediction block whose coordinate positions are (2x−1, 2y), (2x, 2y), (2x+1, 2y), (2x−1, 2y−1), (2x, 2y+1), (2x+1, 2y+1). The values of these 6 samples may be multiplied by the values of the corresponding position in the filter for weighted average, as shown in Eq. (3).

$$P_c(x, y) = \qquad \text{Eq. (3)}$$
$$(P_c'(2x - 1, 2y) + 2 \times P_c'(2x, 2y) + P_c'(2x + 1, 2y) +$$
$$P_c'(2x - 1, 2y + 1) + 2 \times P_c'(2x, 2y + 1) + P_c'(2x + 1, 2y - 1) + 4) >> 3$$

In addition, for chroma samples located at the left most column, a two-tap filter $$\left(\text{e.g., filter} = \begin{pmatrix} 1 \\ 1 \end{pmatrix}\right)$$

is applied instead.

A flag is signaled to indicate whether the TSCPM mode is used or not. When the TSCPM mode is used, an index will be further signaled to indicate which pair selection mode (e.g., TSCPM, TSCPM_L, or TSCPM_T) is used. FIG. 8 is a schematic diagram illustrating an exemplary truncated unary code table, according to some embodiments of the present disclosure. Specifically, this index can be signaled using the truncated unary code according to FIG. 8, as shown in the following Table 1.

TABLE 1

| The index of the pair selection modes | |
|---|---|
| Selection mode | index |
| LT | 1 |
| L | 01 |
| T | 00 |

A Prediction from Multiple Cross-components (PMC) method is adopted in AVS3 in which the prediction of Cr component is derived by a linear model of the reconstructed values of Y component and the reconstructed values of Cb component. The PMC method can be represented by Eq. (4) and Eq. (5), where $R_L$ is the luma reconstructed block and IPred is a temporary chroma prediction block that has the same size of luma coding block. IPred' represents the down-sampled chroma prediction block from IPred which has the same size as chroma coding block. $R_{Cb}$ is the reconstructed block of Cb. $FPred_{Cr}$ is the final prediction block of Cr.

$$IPred = A \cdot R_L + B \qquad \text{Eq. (4)}$$

$$FPred_{Cr} = IPred' - k * R_{Cb} \qquad \text{Eq. (5)}$$

A and B in Eq. (4) and Eq. (5) are the two parameters of PMC model that are derived from the parameters of TSCPM as shown in Eq. (6) and Eq. (7).

$$A = \alpha_0 + \alpha_1 \qquad \text{Eq. (6)}$$

$$B = \beta_0 + \beta_1 \qquad \text{Eq. (7)}$$

where $(\alpha_0, \beta_0)$ and $(\alpha_1, \beta_1)$ are the two sets of linear model parameters derived for Cb and Cr in TSCPM. The factor k can be 0.5, 1, or 2 in AVS3 and is determined by a picture level flag and a CU level flag. In a first step, a picture level flag is signaled. If the picture level flag is equal to a first value (e.g., 0), then factor k is equal to 1 or 2; if the picture level flag is equal to a second value (e.g., 1), then factor k is equal to 1 or 0.5. In a second step, a flag is further signaled for each CU to indicate which of the two k values is used.

In some embodiments, when the value of k is equal to 0.5, the PMC method is called Enhanced PMC (EPMC) method; and when the value of k is equal to 2, the PMC method is called Enhanced PMC 2 (EPMC2) method.

PMC also has three modes: PMC_LT, PMC_T and PMC_L. In these three modes, the selected pair positions when calculating the parameters $(\alpha_0, \beta_0)$ and $(\alpha_1, \beta_1)$ can be the same as the three modes of TSCPM_LT, TSCPM_T, and TSCPM_L as described above, respectively.

In inter prediction, a reference block that has the same or similar content with a current block is found in the previous coded or decoded picture to predict the current block. In the scenarios where luma is varying, even if the reference block has the same content with the current block, the values of the samples in these two blocks may not be close to each other since these two blocks are in the two pictures with different luma. Thus, in order to compensate the luma changes from picture to picture in inter prediction, Local Illumination Compensation (LIC) is introduced, in which a linear model based luma compensation is applied on the reference block to generate a predicted block that has the similar luma level with the current block. Two parameters, $\alpha$ and $\beta$, can be applied to the reference block as the following equation:

$$P(x, y) = \alpha \times R(x, y) + \beta \quad \text{Eq. (8)}$$

where $R(x, y)$ is the reference sample, and $P(x, y)$ is the predicted sample after luma compensation.

Figure 9A:
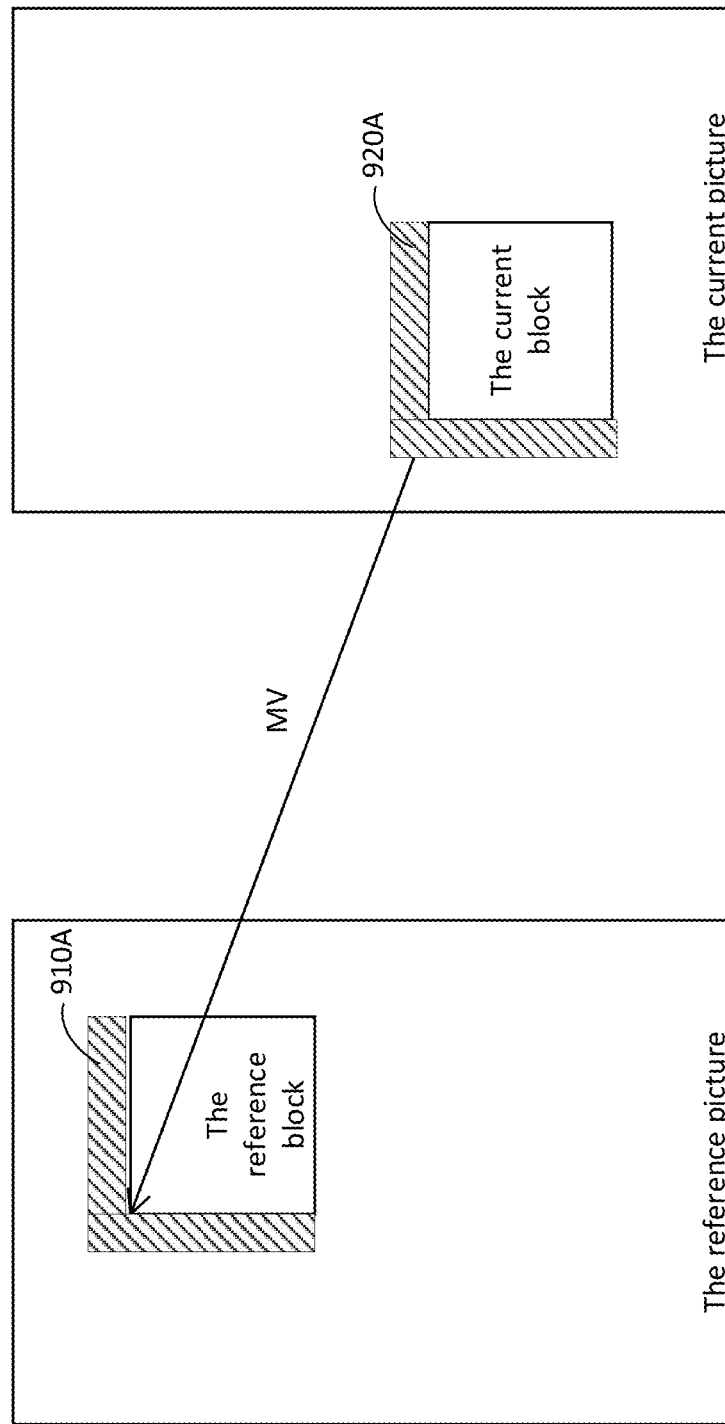
FIG. 9A is a schematic diagram illustrating exemplary a local illumination compensation (LIC) model parameters estimation using neighboring block in the reference picture and the current picture, according to some embodiments of the present disclosure.

The model of luma compensation may be derived on a picture level and applied to all blocks within the picture or derived on a block level and applied on that block only. The block-level luma compensation is also called local luma compensation, in which the decoder derives the parameters in the same way as the encoder so that the parameters don't need to be signaled. FIG. 9A is a schematic diagram illustrating exemplary LIC model parameters estimation using neighboring block in the reference picture and the current picture, according to some embodiments of the present disclosure. Referring to FIG. 9A, to derive the model parameters, the reconstructed samples 920A of the neighboring blocks for current block and predicted samples 910A of the neighboring blocks for reference block are used. In a first step, the linear model parameters are estimated according to a relationship between the predicted sample values of the neighboring blocks of the reference block and reconstructed sample values of the neighboring blocks of the current block. In a second step, the estimated linear model is applied on the predicted samples of the current block to generated luma compensated predicted block.

Figure 9B:
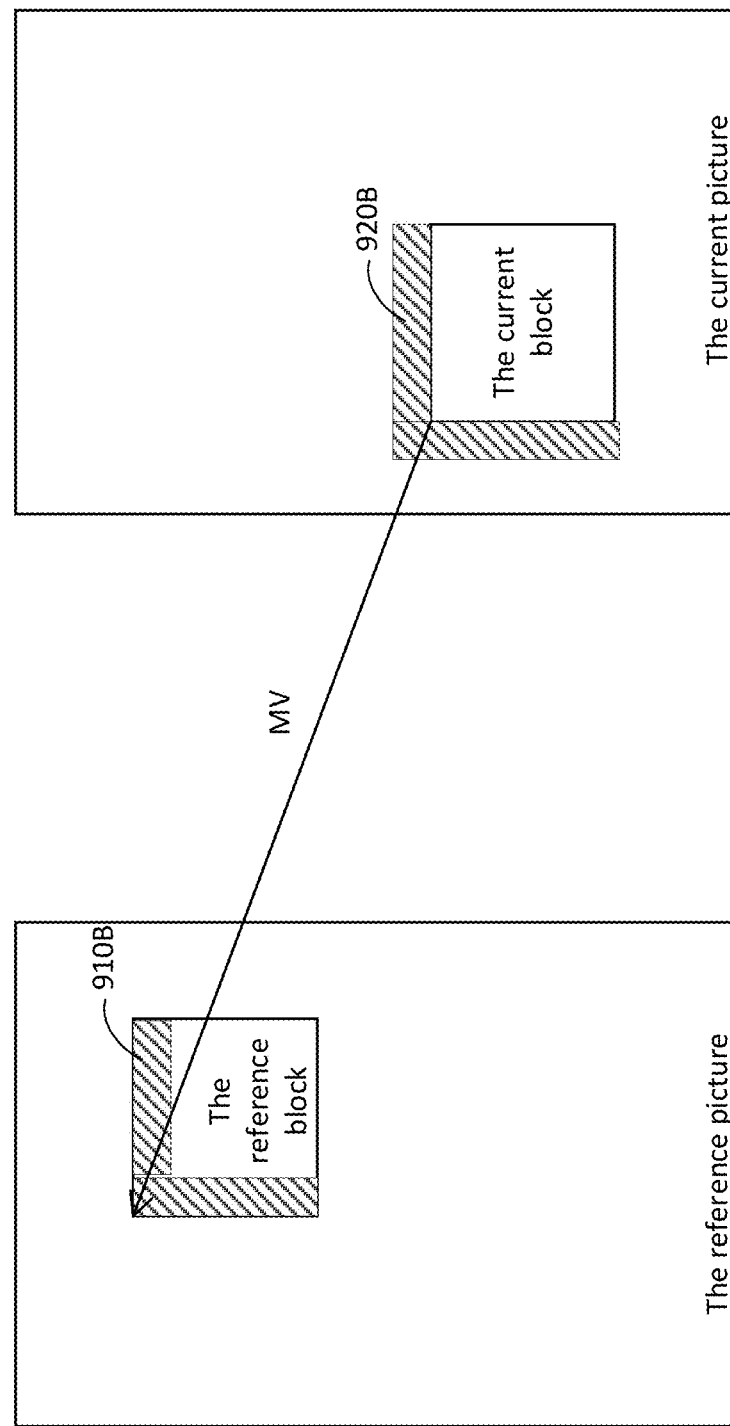
FIG. 9B is a schematic diagram illustrating exemplary LIC model parameters estimation only using neighboring block in the current picture, according to some embodiments of the present disclosure.

As the predicted samples of the neighboring block are used in the parameter estimation, the decoder fetches a block larger than the current block from the reference picture buffer, which increases the bandwidth. To reduce the bandwidth, a current predicted block based local luma compensation is proposed in which the predicted samples on the left and top boundaries within the reference block are used to estimate the parameters instead of using the neighboring block samples. FIG. 9B is a schematic diagram illustrating exemplary LIC model parameters estimation only using neighboring block in the current picture, according to some embodiments of the present disclosure. As shown in FIG. 9B, the predicted samples 910B within the left and upper boundaries of the reference block and the reconstructed samples 920B of left and upper neighboring blocks are used to derive the model parameters.

Figure 10A:
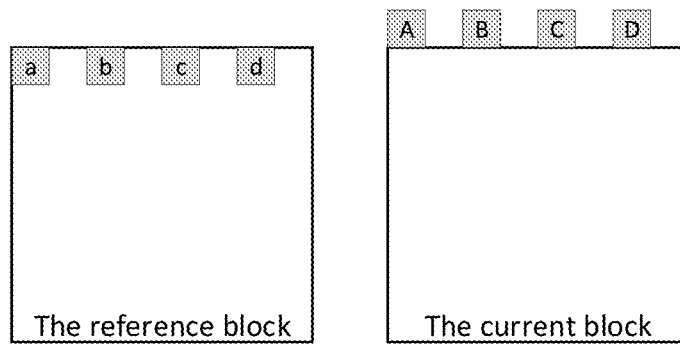
FIG. 10A is a schematic diagram illustrating exemplary LIC model parameters estimation four pairs of samples, according to some embodiments of the present disclosure.
Figure 10B:
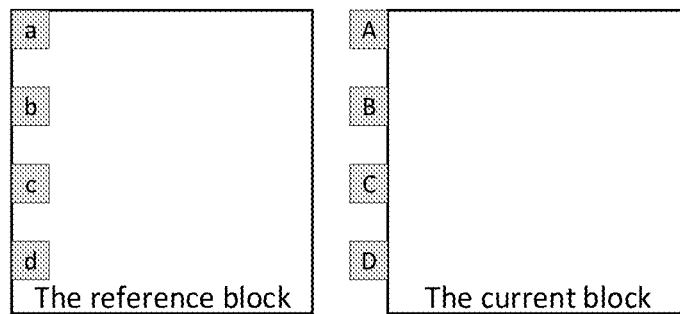
FIG. 10B is a schematic diagram illustrating another exemplary LIC model parameters estimation four pairs of samples, according to some embodiments of the present disclosure.
Figure 10C:
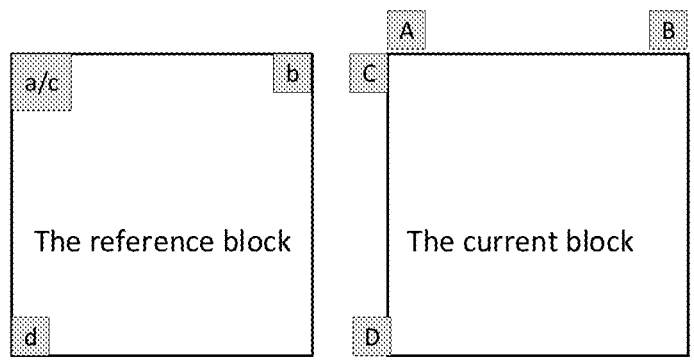
FIG. 10C is a schematic diagram illustrating another exemplary LIC model parameters estimation four pairs of samples, according to some embodiments of the present disclosure.

Least square estimation can be used to estimate the model parameters, but the computational complexity is high. To simplify parameter estimation, four points estimation can be used, in which only four pairs of samples are used. LIC also has three modes: LIC_LT, LIC_T and LIC_L. FIGS. 10A-10C are schematic diagrams illustrating exemplary LIC model parameters estimation using four pairs of samples, according to some embodiments of the present disclosure. In these three modes, the selected pair positions are the same as the three modes of TSCPM_LT, TSCPM_T, and TSCPM_L, respectively. FIG. 10A illustrates exemplary LIC model parameters estimations using four pairs for LIC_T, according to some embodiments of the present disclosure. As shown in FIG. 10A, when only the top row is available, the reconstructed samples (e.g., A, B, C, and D) of the neighboring block of the current block are selected. The four pairs are all selected from the top row. FIG. 10B illustrates exemplary LIC model parameters estimations four pairs for LIC_L, according to some embodiments of the present disclosure. As shown in FIG. 10B, when only the left column is available, the reconstructed samples (e.g., A, B, C, and D) of the neighboring block of the current block are selected. The four pairs are all selected from the left column. FIG. 10C illustrates exemplary LIC model parameters estimations using four pairs for LIC_LT, according to some embodiments of the present disclosure. As shown in FIG. 10C, when both the top row and the left column are available, the reconstructed samples (e.g., A, B, C, and D) of the neighboring block of the current block are selected. Two selected pairs are from the top row, and two selected pairs are from the left column. In some embodiments, the predicted sample within the reference block could be corresponding to two selected pairs, for example, the predicted sample a/c in the reference block is corresponding to both reconstructed sample A and reconstructed sample C in the current block. Based on these 4 selected pairs, LIC uses the same parameter calculation method as TSCPM.

Conventionally, TSCPM, PMC and LIC use the same method to derive the linear model parameters and only 4 pairs are used. The purpose of this design is to reduce the computational complexity of deriving the linear model parameters at both the encoder and the decoder. However, the 4 pair positions selected in the current design cannot be guaranteed to contain the texture characteristics of the current block, which means that the derived parameters may not be accurate enough.

For example, for the left-top (LT) mode, only the 4 pairs next to the four corners are used. The characteristics of the middle part of the neighboring row and column are not considered.

TSCPM, PMC and LIC all construct linear model parameters based on the selected 4 pairs. In the current design, there are 3 pair selection modes, LT, L and T modes. Therefore, it is proposed to add one or more pair selection modes to improve the prediction accuracy for selecting pairs of different positions for the current pair selection modes (LT, L, and T modes) to derive the linear model parameters.

The embodiments of the present disclosure provide methods of extending the pair selection modes to improve coding efficiency.

In some embodiments, to improve the accuracy of the linear model parameters constructed in TSCPM, PMC and LIC, a new pair selection mode is proposed. Specifically, an enhanced LT (ELT) mode is added on the basis of the LT, L and T modes.

Figure 11A:
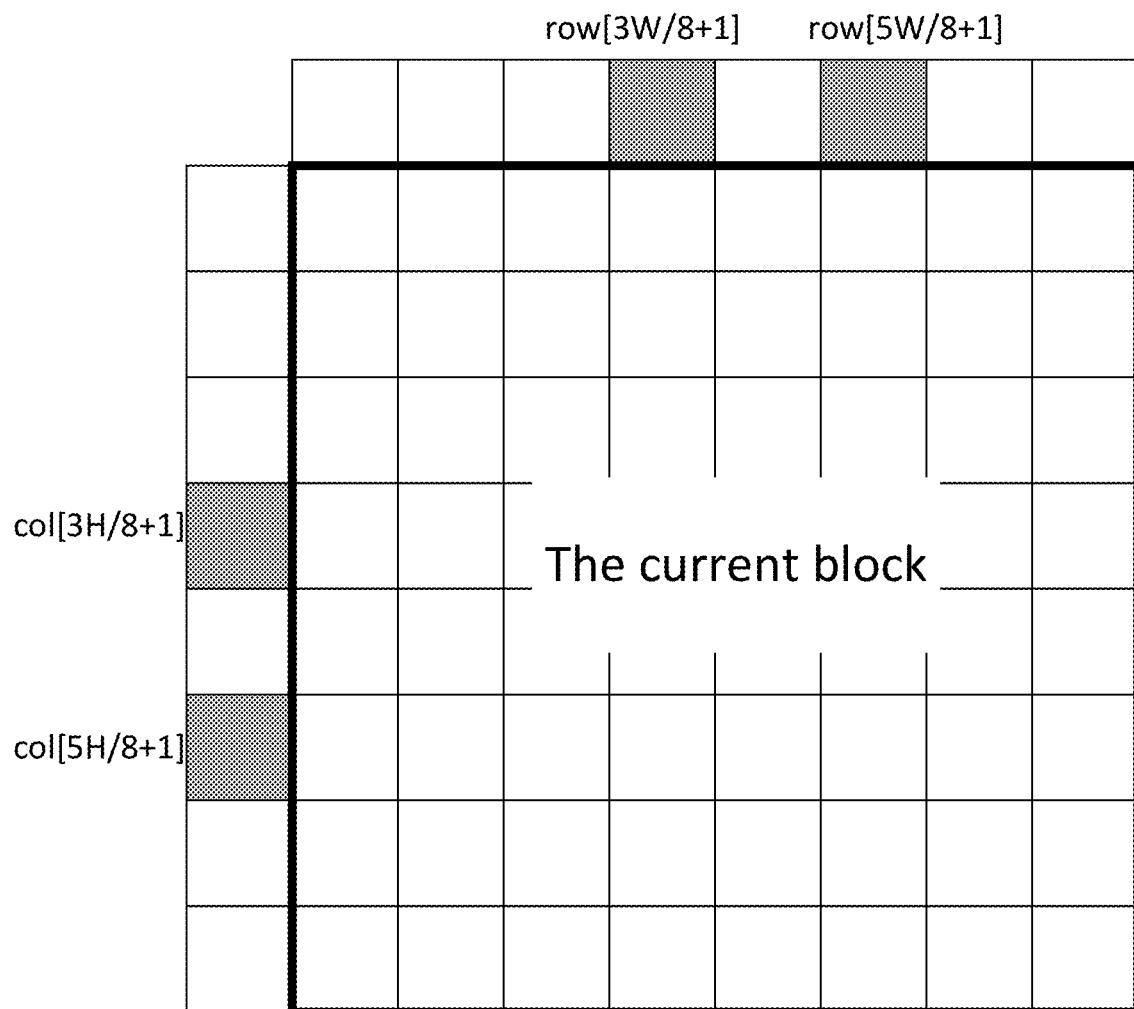
FIG. 11A is a schematic diagram illustrating selected pairs for an enhanced left-top (ELT) mode, according to some embodiments of the present disclosure.
Figure 11B:
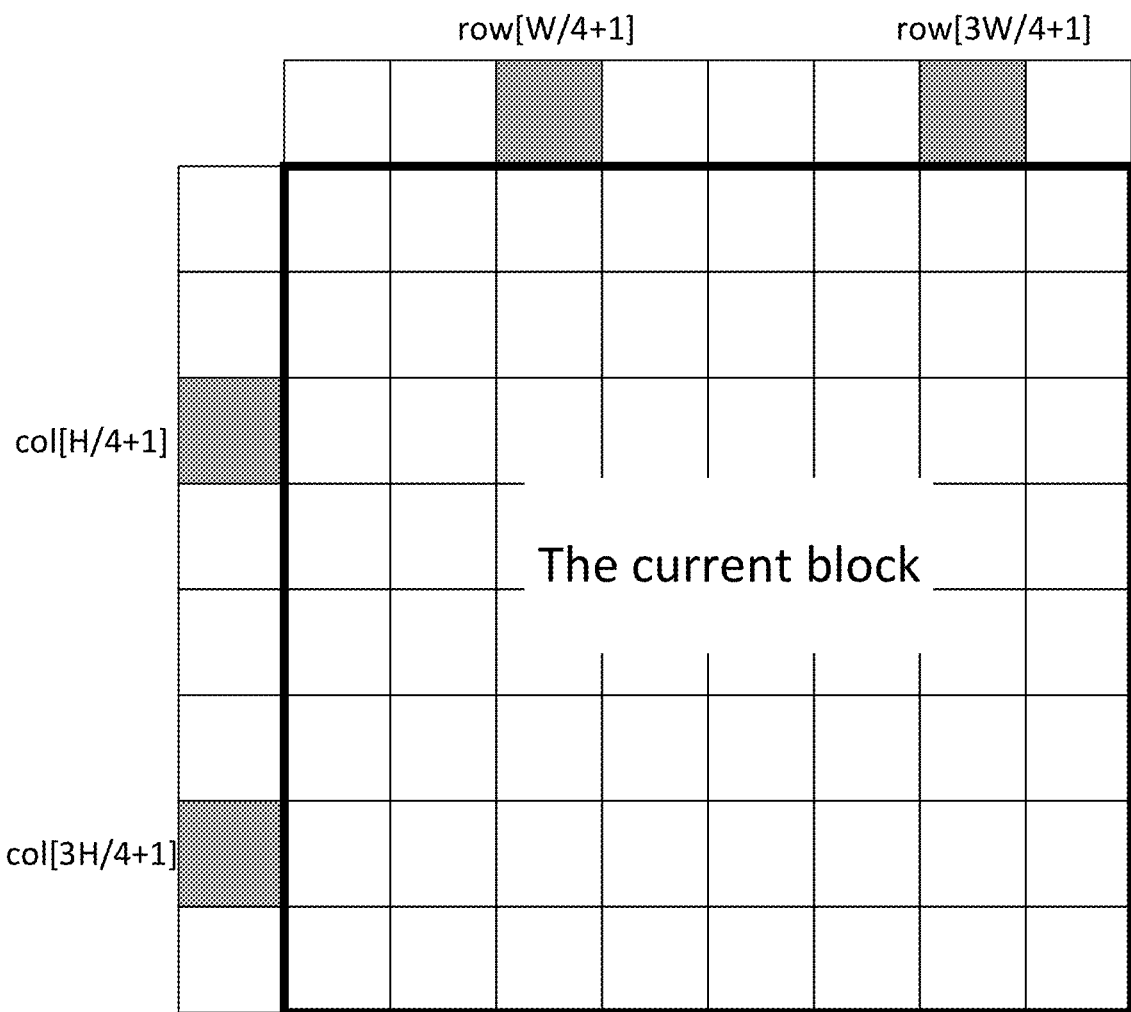
FIG. 11B is a schematic diagram illustrating selected pairs for ELT mode, according to some embodiments of the present disclosure.
Figure 11C:
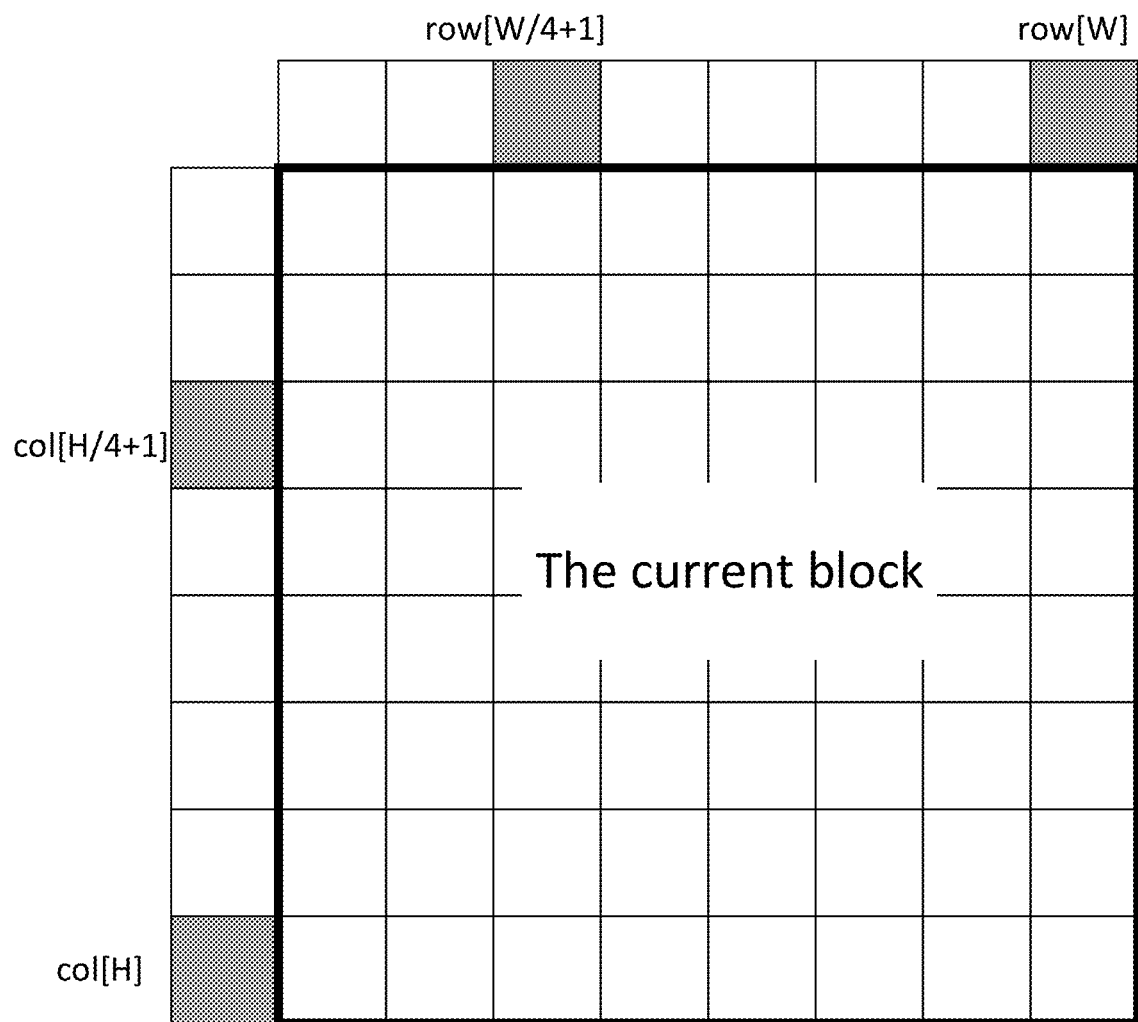
FIG. 11C is a schematic diagram illustrating selected pairs for ELT mode, according to some embodiments of the present disclosure.

FIGS. 11A-11C illustrate exemplary selected pairs for an ELT mode, according to some embodiments of the present disclosure. For a W×H prediction block, the row[1, . . . , W] represents the reconstructed pairs of the top neighboring row and the col[1, . . . , H] represents the reconstructed pairs of the left neighboring column, where W and H are the width and height of the prediction block, respectively.

In the ELT mode, 4 pairs in the top row and left column are selected. These 4 pairs can be selected at any position in the top neighboring row or the left neighboring row when the top neighboring row or the left neighboring row are available.

In some embodiments, as shown in FIG. 11A, if both top neighboring row (e.g., row[1, . . . , W]) and left neighboring column (e.g., col[1, . . . , H]) are available, the pairs at row[3W/8+1], row[5W/8+1], col[3H/8+1] and col[5H/8+1]

are selected. If only top neighboring row (e.g., row[1, . . . , W]) is available, the pairs at row[1], row[W/4+1], row[2W/4+1] and row[3W/4+1] are selected. If only left neighboring column (e.g., col[1, . . . , H]) is available, the pairs at col[1], col[H/4+1], col[2H/4+1] and col[3H/4+1] are selected. In these embodiments, when only one of top neighboring row (e.g., row[1, . . . , W]) and left neighboring column (e.g., col[1, . . . , H]) is available, the positions of the pairs selected by the proposed ELT mode and the LT mode are the same. In order to reduce redundancy, in some embodiments, the positions of the pairs selected by ELT mode is modified as follows: if both top neighboring row (e.g., row[1, . . . , W]) and left neighboring column (e.g., col[1, . . . , H]) are available, the pairs at row[3W/8+1], row[5W/8+1], col[3H/8+1], and col[5H/8+1] are selected; if only top neighboring row (e.g., row[1, . . . , W]) is available, the pairs at row[W/8+1], row[3W/8+1], row[5W/8+1] and row[7W/8+1] are selected; and if only left neighboring column (e.g., col[1, . . . , H]) is available, the pairs at col[H/8+1], col[3H/8+1], col[5H/8+1] and col[7H/8+1] are selected.

In the above-described embodiments, when both the row[1, . . . , W] and col[1, . . . , H] are available, the enhanced LT mode (ELT) selects two pairs in the top neighboring row and two pairs in the left neighboring column that are all different from the four pairs selected in LT mode.

In some embodiments, the ELT mode can select pairs at other positions. As shown in FIG. 11B, if both top neighboring row (e.g., row[1, . . . , W]) and left neighboring column (e.g., col[1, . . . , H]) are available and the ELT mode is used, the pairs at row[W/4+1], row[3W/4+1], col[H/4+1] and col[3H/4+1] are selected.

In some embodiments, as shown in FIG. 11C, if both top neighboring row (e.g., row[1, . . . , W]) and left neighboring column (e.g., col[1, . . . , H]) are available and the ELT mode is used, the pairs at row[W/4+1], row[W], col[H/4+1] and col[H] are selected.

With the ELT mode, there are 4 pair selection modes in total. In some embodiments, a truncated unary code can be used for an index to indicate each pair selection mode, as shown in Table 2. In this embodiment, the signaling order of the ELT mode is after the LT mode and before the L and T modes, that is, the code length required to signal the ELT mode is longer than that of the LT mode and shorter than that of the L and T modes. In some embodiments, the signaling order for different selection modes can be varied. Therefore, the indices for the selection modes can be varied.

TABLE 3

| The index of the pair selection modes | |
| --- | --- |
| Selection mode | index |
| LT | 1 |
| ELT | 01 |
| L | 001 |
| T | 000 |

In some embodiments, a flag is signaled to indicate whether the TSCPM mode is used or not. When the TSCPM mode is used, the index according to Table 2 can be further signaled to indicate which pair selection mode (e.g., TSCPM_LT, TSCPM_ELT, TSCPM_L, or TSCPM_T) is used.

In some embodiments, at decoder side, a variable is determined to indicate a combination of the prediction mode (e.g., TSCPM, PMC, LIC etc.) and a selection mode (e.g., LT, ELT, L, T, etc.). Therefore, for example, in some embodiments, based on the variable, the TSCPM_LT (or, TSCPM_ELT, TSCPM_L, TSCPM_T) can be determined for decoding the current block.

In some embodiments, a fixed-length code can be used to code the index of the pair selection modes. For example, if the LT, L, T or the ELT modes are used, the index can be coded as shown in Table 4.

TABLE 5

| The index of the pair selection modes | |
| --- | --- |
| Selection mode | index |
| LT | 10 |
| ELT | 11 |
| L | 00 |
| T | 01 |

In some embodiments, the order of the pair selection modes can be different. For example, if the LT, L, T and the ELT modes are used, in the above-described embodiment, when coding the index, the 4 modes are sorted in the order of LT, ELT, L, and T (as showing in Tables 1 to 3). However, the order can be sorted in other orders, for example, the order can be sorted according to an order of LT, L, T and ELT. So that when coding with truncated unary code, the codewords of different modes are shown in Table 6.

TABLE 7

| The index of the pair selection modes | |
| --- | --- |
| Selection mode | index |
| LT | 1 |
| L | 01 |
| T | 001 |
| ELT | 000 |

In some embodiments, instead of using fixed indices to represent the pair selection modes, the pair selection modes are adaptively reordered according to the selection modes of neighboring blocks. For example, if the top and left neighboring blocks both use PMC_T mode, the probability of using the PMC_T mode of the current block may be higher than using the other PMC modes. Therefore, the PMC_T is indicated using index 0 which is binarized with smaller number of bins. The other modes are indicated using other indices. For example, the index of the pair selection modes can be coded as shown in Table. 5.

TABLE 5

| The index of the pair selection modes | |
| --- | --- |
| Selection mode | index |
| T | 1 |
| LT | 01 |
| ELT | 001 |
| L | 000 |

Similarly, if the top and left neighboring blocks are both use PMC_L mode, the probability of using the PMC_L mode of the current block may be higher than using the other PMC modes. Therefore, the PMC_L is indicated using index 0 which is binarized with smaller number of bins.

In some embodiments, an enhanced L (EL) mode or enhanced T (ET) mode is proposed. For the EL mode, 4 pairs are selected from the left column and are different from the 4 pairs selected in the L mode. For the ET mode, 4 pairs are selected from the top row and are different from the 4 pairs selected in the T mode.

In one example, for the EL mode, the pairs at col[H/8+1], col[3H/8+1], col[5H/8+1] and col[7H/8+1] are selected; for the ET mode, the pairs at row[W/8+1], row[3W/8+1], row[5W/8+1] and row[7W/8+1] are selected.

In some embodiments, two or more different pair selection modes are proposed.

In some embodiments, the ELT, EL, and ET modes can be used together. Therefore, there are a total of 6 different pair selection modes (LT, L, T, ELT, EL, and ET modes) can be used. For example, if the LT, L, T and the ELT, EL, ET modes are all used, the index can be coded as Table 6 with a fixed-length code:

TABLE 6

| The index of the pair selection modes | |
|---|---|
| Selection mode | index |
| LT | 000 |
| ELT | 001 |
| L | 010 |
| EL | 011 |
| T | 100 |
| ET | 101 |

In some embodiments, the index can be coded as Table 7 with a truncated binary code.

TABLE 7

| The index of the pair selection modes | |
|---|---|
| Selection mode | index |
| LT | 10 |
| ELT | 11 |
| L | 000 |
| EL | 001 |
| T | 010 |
| ET | 011 |

In some embodiments, the index can be coded as Table 8 with a truncated unary code.

TABLE 8

| The index of the pair selection modes | |
|---|---|
| Selection mode | index |
| LT | 1 |
| ELT | 01 |
| L | 001 |
| EL | 0001 |
| T | 00001 |
| ET | 00000 |

In some embodiments, the EL and ET modes are both used. Therefore, there are a total of 5 different pair selection modes (LT, L, T, EL, and ET modes) that can be used.

In the above-described embodiments, a truncated unary code can be used to code the index of the pair selection modes. In some embodiments, a fixed-length code can be used to code the index of the pair selection modes.

In some embodiments, it could be understood that for a prediction block, row[0, . . . , W−1] can be used to represent the reconstructed pairs of the top neighboring row and col[0, . . . , H−1] can be used to represent the reconstructed pairs of the left neighboring column. In other words, the index values of the reconstructed pairs in the top neighboring row are 0 to W−1, and the index values of the reconstructed pairs in the left neighboring column are 0 to H−1. Therefore, the index of the selected pairs by the selection method mentioned in the above-described embodiments should minuses 1. For example, selecting the pairs at row [3W/8+1], row[5W/8+1], col[3H/8+1] and col[5H/8+1] when top neighboring row being row[1, . . . , W] and the left neighboring column being col[1, . . . , H] is equivalent to selecting the pairs at row[3W/8], row[5W/8], col[3H/8] and col[5H/8] when top neighboring row is denoted as row[0, . . . , W−1] and the left neighboring column is denoted as col[0, . . . , H−1].

Figure 12:
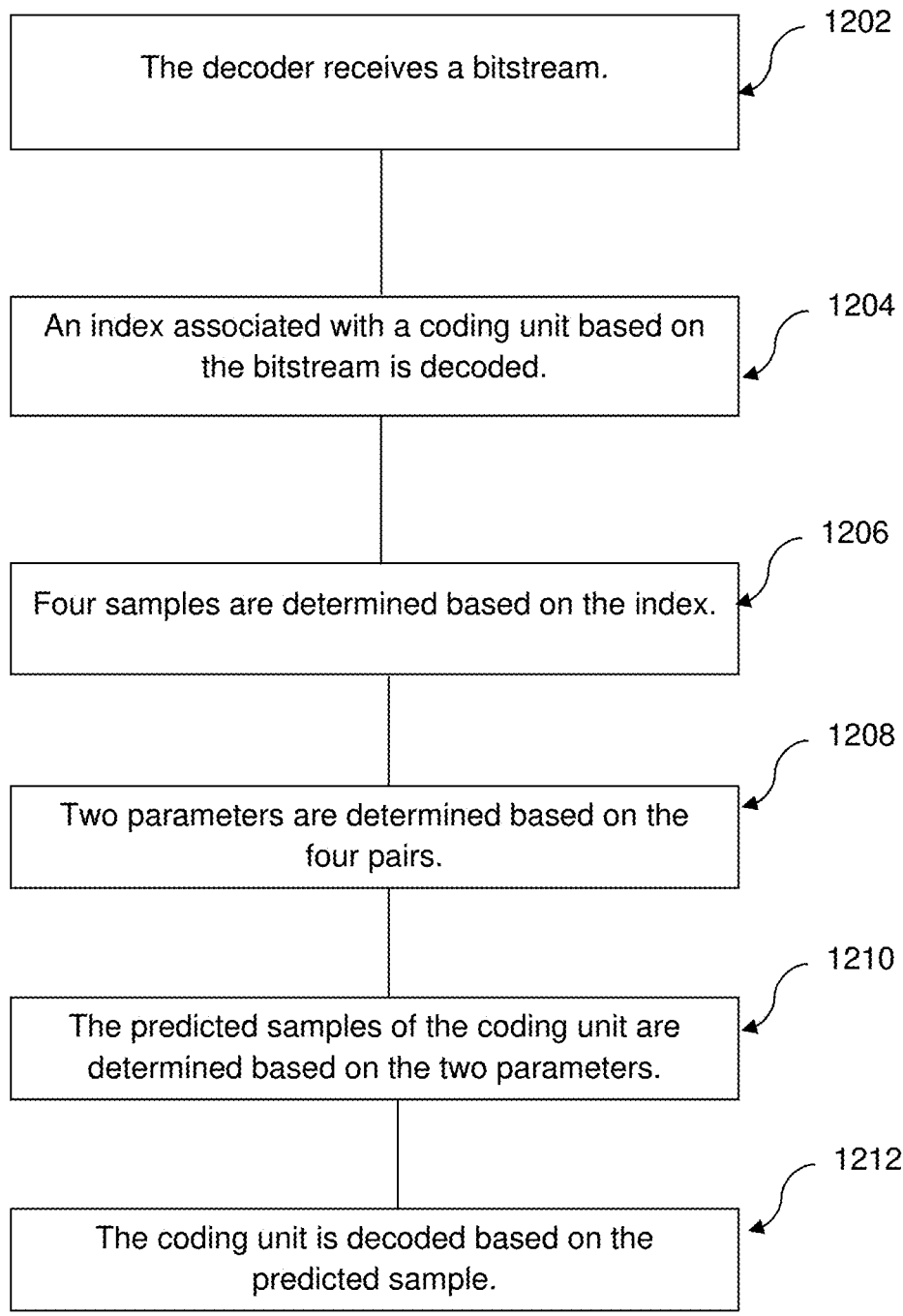
FIG. 12 illustrates a flow chart of an example method for decoding a video bitstream, according to some embodiments of present disclosure.

FIG. 12 illustrates a flow chart of an example method 1200 for decoding a video bitstream, according to some embodiments of the present disclosure. Method 1200 can be performed by a decoder (e.g., by process 300A of FIG. 3A or 300B of FIG. 3B), or performed by one or more software or hardware components of an apparatus (e.g., apparatus 400 of FIG. 4). For example, a processor (e.g., processor 402 of FIG. 4) can perform method 1200. In some embodiments, method 1200 can be implemented by a computer program product, embodied in a computer-readable medium, including computer-executable instructions, such as program code, executed by computers (e.g., apparatus 400 of FIG. 4). Referring to FIG. 12, method 1200 may include the following steps 1202-1212.

At step 1202, the decoder receives a bitstream (e.g., video bitstream 228 in FIG. 3B). The bitstream may be coded using inter prediction or intra prediction, for example, coded with TSCPM, PMC or LIC.

At step 1204, an index associated with a coding unit based on the bitstream is decoded. The index indicating a selection mode among at least four selection modes. For example, the selection modes can include LT, ELT, T, ET, L and EL.

In some embodiments, the sample selection modes must include the ELT mode. For example, the sample selection modes can be the LT, L, T, and ELT modes. In some embodiments, the index for indicating the sample selection modes can be binarized with a truncated unary code, a fixed-length code, or a truncated binary code. For example, the binarization of the index values indicating the sample selection modes can be consistent with the indices shown in Table 2 to Table 8.

At step 1206, four samples are determined based on the index. In some embodiments, the four samples are selected by the sample selection mode indicated by the index. In some embodiments, a variable is determined, and the variable is associated with the index. The four samples are determined based on the variable. The variable indicates a combination of a sample selection mode and a prediction mode. The prediction mode can be one of a two step cross-component prediction mode (TSCPM), a prediction from multiple cross-components (PMC) mode, or a local illumination compensation (LIC) mode.

At step 1208, two parameters are determined based on the four samples. The two parameters can derive a linear model to predict the coding unit. The method for determine the two parameters can be referred to Eq. (1).

At step 1210, the predicted samples of the coding unit are determined based on the two parameters. The method for determining the predicted sample can be referred to Eq. (3) and Eq. (8).

At step 1212, the coding unit is decoded based on the predicted sample.

Figure 13:
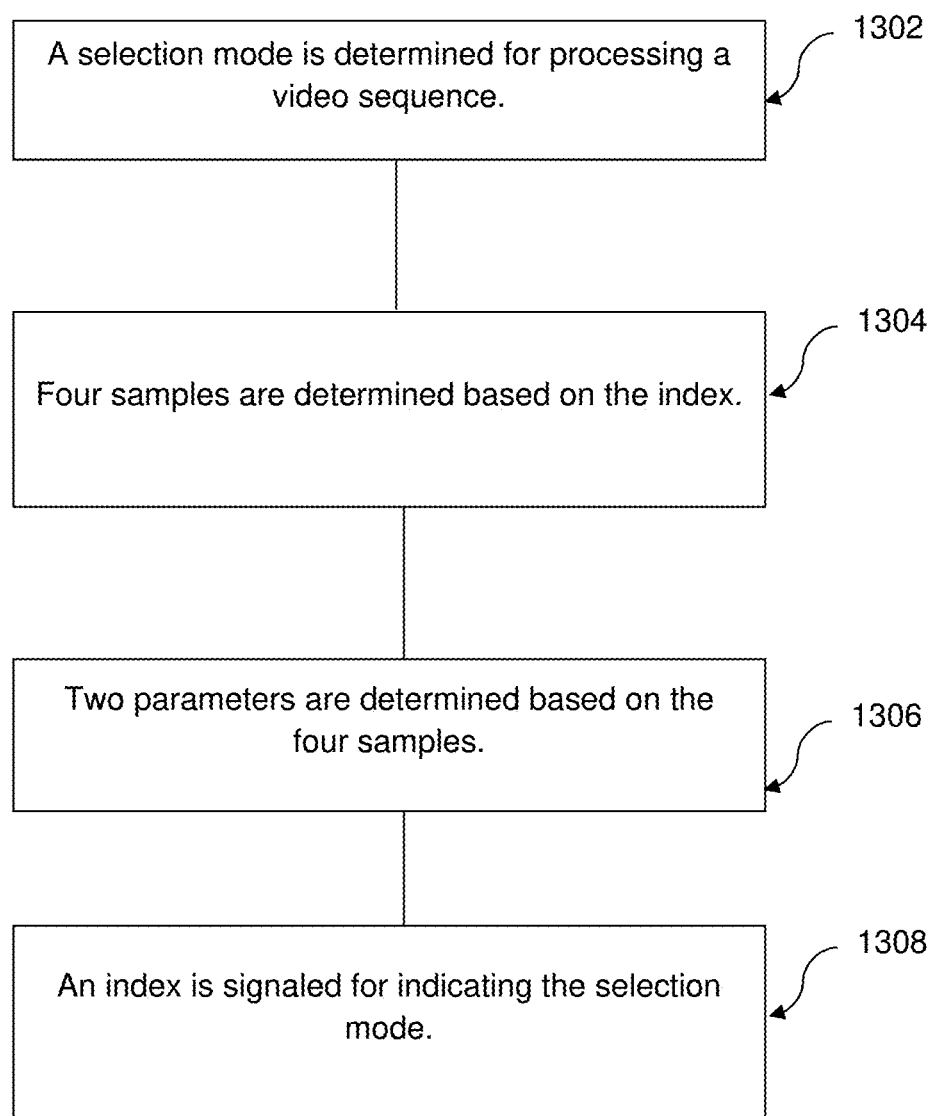
FIG. 13 illustrates a flow chart of an example method for encoding a video sequence, according to some embodiments of the present disclosure.

FIG. 13 illustrates a flow chart of an example method 1300 for encoding a video sequence, according to some embodiments of the present disclosure. Method 1300 can be performed by an encoder (e.g., by process 200A of FIG. 2A or 200B of FIG. 2B), or performed by one or more software or hardware components of an apparatus (e.g., apparatus 400 of FIG. 4). For example, a processor (e.g., processor 402 of FIG. 4) can perform method 1300. In some embodiments, method 1300 can be implemented by a computer program product, embodied in a computer-readable medium, including computer-executable instructions, such as program code, executed by computers (e.g., apparatus 400 of FIG. 4). Referring to FIG. 13, method 1300 may include the following steps 1302-1308.

At step 1302, a selection mode is determined for processing a video sequence. The selection mode can be selected from at least four selection modes. For example, the selection modes can include LT, ELT, T, ET, L and EL. In some embodiments, the sample selection modes must include the ELT mode. For example, the sample selection modes can be the LT, L, T, and ELT modes. In some embodiments, the index for indicating the sample selection modes can be binarized with a truncated unary code, a fixed-length code, or a truncated binary code. For example, the binarization of the index values indicating the sample selection modes can be consistent with the indices shown in Table 2 to Table 8.

At step 1304, four samples are determined based on the index.

At step 1306, two parameters are determined based on the four samples.

At step 1308, an index is signaled for indicating the selection mode. The prediction mode can be one of a two step cross-component prediction mode (TSCPM), a prediction from multiple cross-components (PMC) mode, or a local illumination compensation (LIC) mode.

In some embodiments, the index can be encoded before it is signaled in step 1308.

The embodiments may further be described using the following clauses:

1. A video data processing method, comprising:
receiving a bitstream;
decoding an index associated with a coding unit based on the bitstream, the index indicating a selection mode among at least four selection modes;
determining four samples based on the index;
determining two parameters based on the four samples;
determining predicted samples of the coding unit based on the two parameters; and
decoding the coding unit based on the predicted samples.

2. The method according to clause 1, wherein determining four samples based on the index further comprises:
determining four samples among a plurality of top neighboring samples and a plurality of left neighboring samples of the coding unit, wherein the four samples are determined at row[3W/8+1], row[5W/8+1], col[3H/8+1] and col[5H/8+1], wherein row[1, . . . , W] represents top neighboring reconstructed samples of the coding unit and col[1, . . . , H] represents left neighboring reconstructed samples of the coding unit, W and H represent a width and a height of the coding unit respectively.

3. The method according to clause 1 or 2, wherein before determining four samples based on the index, the method comprises:
determining whether a plurality of the top neighboring samples and a plurality of the left neighboring samples are available; and
in determining four samples based on the index, the method further comprises:
determining the four samples based on an availability of the plurality of the top neighboring samples and the plurality of the left neighboring samples; and
in response to both of the plurality of the top neighboring samples and the plurality of the left neighboring samples being available, determining two of the four samples among the plurality of top neighboring samples and other two of the four samples among the plurality of left neighboring samples;
in response to the plurality of the top neighboring samples being not available and the plurality of the left neighboring samples being available, determining the four samples among the plurality of left neighboring samples; or
in response to the plurality of the top neighboring samples being available and the plurality of the left neighboring samples being not available, determining the four samples among the plurality of top neighboring samples.

4. The method according to clause 3, wherein determining the four samples based on the availability of the plurality of the top neighboring samples and the plurality of the left neighboring samples further comprises:
in response to both of the plurality of the top neighboring samples and the plurality of the left neighboring samples being available, determining the four samples at row[3W/8+1], row[5W/8+1], col[3H/8+1] and col[5H/8+1];
in response to the plurality of the top neighboring samples being not available and the plurality of the left neighboring samples being available, determining the four samples at col[H/8+1], col[3H/8+1], col[5H/8+1], and col[7H/8+1]; or
in response to the plurality of the top neighboring samples being available and the plurality of the left neighboring samples being not available, determining the four samples at row[W/8+1], row[3W/8+1], row[5W/8+1], and row[7W/8+1];
wherein row[1, . . . , W] represents top neighboring reconstructed samples of the coding unit and col[1, . . . , H] represents left neighboring reconstructed samples of the coding unit, W and H represent a width and a height of the coding unit respectively.

5. The method according to clause 1, further comprising:
determining a variable indicating a combination of a prediction mode and the selection mode, wherein the variable is associated with the index;
determining the four samples based on the variable; and
in response to the variable being equal to a first value, determining two of the four samples among a plurality of top neighboring samples and other two of the four samples among a plurality of left neighboring samples;
in response to the variable being equal to a second value, determining two of the four samples among the plurality of the top neighboring samples and other two of the four samples among the plurality of the left neighboring samples, wherein the four samples determined when the variable being equal to the second value are different from the four samples determined when the variable being equal to the first value;
in response to the variable being equal to a third value, determining the four samples among the plurality of the left neighboring samples; or
in response to the variable being equal to a fourth value, determining the four samples among the plurality of the top neighboring samples.

6. The method according to clause 5, wherein the index is binarized with a truncated unary code, in response to the variable being equal to the first value, the index is binarized to 1;

in response to the variable being equal to the second value, the index is binarized to 01;

in response to the variable being equal to the third value, the index is binarized to 001, or in response to the variable being equal to the fourth value, the index is binarized to 000.

7. The method according to clause 1, wherein determining the predicted samples of the coding unit further comprising:

determining a variable indicating a combination of a prediction mode and the selection mode, wherein the variable is associated with the index;

in response to the variable being equal to a value, determining the predicted samples of the coding unit based on the two parameters.

8. The method according to any one of clauses 1 to 7, wherein the index is binarized with a truncated unary code, a truncated binary code, or a fixed-length code.

9. An apparatus for performing video data processing, the apparatus comprising:

a memory figured to store instructions; and one or more processors configured to execute the instructions to cause the apparatus to perform:

receiving a bitstream;

decoding an index associated with a coding unit based on the bitstream, the index indicating a selection mode among at least four selection modes;

determining four samples based on the index;

determining two parameters based on the four samples;

determining predicted samples of the coding unit based on the two parameters; and decoding the coding unit based on the predicted samples.

10. The apparatus according to clause 9, wherein in determining four samples based on the index, the processor is further configured to execute the instructions to cause the apparatus to perform:

determining four samples among a plurality of top neighboring samples and a plurality of left neighboring samples of the coding unit, wherein the four samples are determined at row[3W/8+1], row[5W/8+1], col[3H/8+1] and col[5H/8+1], wherein row[1, . . . , W] represents top neighboring reconstructed samples of the coding unit and col[1, . . . , H] represents left neighboring reconstructed samples of the coding unit, W and H represent a width and a height of the coding unit respectively.

11. The apparatus according to clause 9 or 10, wherein before determining four samples based on the index, the processor is further configured to execute the instructions to cause the apparatus to perform:

determining whether a plurality of the top neighboring samples and a plurality of the left neighboring samples are available; and in determining four samples based on the index, the method further comprises:

determining the four samples based on an availability of the plurality of the top neighboring samples and the plurality of the left neighboring samples;

in response to both of the plurality of the top neighboring samples and the plurality of the left neighboring samples being available, determining two of the four samples among the plurality of top neighboring samples and other two of the four samples among the plurality of left neighboring samples;

in response to the plurality of the top neighboring samples being not available and the plurality of the left neighboring samples being available, determining the four samples among the plurality of left neighboring samples; and in response to the plurality of the top neighboring samples being available and the plurality of the left neighboring samples being not available, determining the four samples among the plurality of top neighboring samples.

12. The apparatus according to clause 11, wherein in determining the four samples based on the availability of the plurality of the top neighboring samples and the plurality of the left neighboring samples, the processor is further configured to execute the instructions to cause the apparatus to perform:

in response to both of the plurality of the top neighboring samples and the plurality of the left neighboring samples being available, determining the four samples at row[3W/8+1], row[5W/8+1], col[3H/8+1] and col[5H/8+1];

in response to the plurality of the top neighboring samples being not available and the plurality of the left neighboring samples being available, determining the four samples at col[H/8+1], col[3H/8+1], col[5H/8+1], and col[7H/8+1]; and in response to the plurality of the top neighboring samples being available and the plurality of the left neighboring samples being not available, determining the four samples at row[W/8+1], row[3W/8+1], row[5W/8+1], and row[7W/8+1];

wherein row[1, . . . , W] represents top neighboring reconstructed samples of the coding unit and col[1, . . . , H] represents left neighboring reconstructed samples of the coding unit, W and H represent a width and a height of the coding unit respectively.

13. The apparatus according to clause 11, wherein the processor is further configured to execute the instructions to cause the apparatus to perform:

determining a variable indicating a combination of a prediction mode and the selection mode, wherein the variable is associated with the index;

determining the four samples based on the variable;

in response to the variable being equal to a first value, determining two of the four samples among a plurality of top neighboring samples and other two of the four samples among a plurality of left neighboring samples;

in response to the variable being equal to a second value, determining two of the four samples among the plurality of the top neighboring samples and other two of the four samples among the plurality of the left neighboring samples, wherein the four samples determined when the variable being equal to the second value are different from the four samples determined when the variable being equal to the first value;

in response to the variable being equal to a third value, determining the four samples among the plurality of the left neighboring samples; and in response to the variable being equal to a fourth value, determining the four samples among the plurality of the top neighboring samples.

14. The apparatus according to clause 13, wherein the index is binarized with a truncated unary code, in response to the variable being equal to the first value, the index is binarized to 1;

in response to the variable being equal to the second value, the index is binarized to 01;

in response to the variable being equal to the third value, the index is binarized to 001, and in response to the variable being equal to the fourth value, the index is binarized to 000.

15. The apparatus according to clause 9, wherein in determining the predicted samples of the coding unit, the processor is further configured to execute the instructions to cause the apparatus to perform:

determining a variable indicating a combination of a prediction mode and the selection mode, wherein the variable is associated with the index;

in response to the variable being equal to a value, determining the predicted samples of the coding unit based on the two parameters.

16. The apparatus according to any one of clauses 9 to 15, wherein the index is binarized with a truncated unary code, a truncated binary code, or a fixed-length code.

17. A non-transitory computer readable medium that stores a set of instructions that is executable by one or more processors of an apparatus to cause the apparatus to initiate a method for performing video data processing, the method comprising:

receiving a bitstream;

decoding an index associated with a coding unit based on the bitstream, the index indicating a selection mode among at least four selection modes;

determining four samples based on the index;

determining two parameters based on the four samples;

determining predicted samples of the coding unit based on the two parameters; and decoding the coding unit based on the predicted samples.

18. The non-transitory computer readable medium according to clause 17, wherein in determining four samples based on the index, the set of instructions that is executable by one or more processors of an apparatus to cause the apparatus to further perform:

determining four samples among a plurality of top neighboring samples and a plurality of left neighboring samples of the coding unit, wherein the four samples are determined at row[3W/8+1], row[5W/8+1], col[3H/8+1], and col[5H/8+1], wherein row[1, . . . , W] represents top neighboring reconstructed samples of the coding unit and col[1, . . . , H] represents left neighboring reconstructed samples of the coding unit, W and H represent a width and a height of the coding unit respectively.

19. The non-transitory computer readable medium according to clause 17 or 18, wherein before determining four samples based on the index, the set of instructions that is executable by one or more processors of an apparatus to cause the apparatus to further perform:

determining whether a plurality of the top neighboring samples and a plurality of the left neighboring samples are available; and in determining four samples based on the index, the method further comprises:

determining the four samples based on an availability of the plurality of the top neighboring samples and the plurality of the left neighboring samples;

in response to both of the plurality of the top neighboring samples and the plurality of the left neighboring samples being available, determining two of the four samples among the plurality of top neighboring samples and other two of the four samples among the plurality of left neighboring samples;

in response to the plurality of the top neighboring samples being not available and the plurality of the left neighboring samples being available, determining the four samples among the plurality of left neighboring samples; and in response to the plurality of the top neighboring samples being available and the plurality of the left neighboring samples being not available, determining the four samples among the plurality of top neighboring samples.

20. The non-transitory computer readable medium according to clause 19, wherein in determining the four samples based on the availability of the plurality of the top neighboring samples and the plurality of the left neighboring samples, the set of instructions that is executable by one or more processors of an apparatus to cause the apparatus to further perform:

in response to both of the plurality of the top neighboring samples and the plurality of the left neighboring samples being available, determining the four samples at row[3W/8+1], row[5W/8+1], col[3H/8+1], and col[5H/8+1];

in response to the plurality of the top neighboring samples being not available and the plurality of the left neighboring samples being available, determining the four samples at col[H/8+1], col[3H/8+1], col[5H/8+1], and col[7H/8+1]; and in response to the plurality of the top neighboring samples being available and the plurality of the left neighboring samples being not available, determining the four samples at row[W/8+1], row[3W/8+1], row[5W/8+1], and row[7W/8+1];

wherein row[1, . . . , W] represents top neighboring reconstructed samples of the coding unit and col[1, . . . , H] represents left neighboring reconstructed samples of the coding unit, W and H represent a width and a height of the coding unit respectively.

21. The non-transitory computer readable medium according to clause 17, wherein the set of instructions that is executable by one or more processors of an apparatus to cause the apparatus to further perform:

determining a variable indicating a combination of a prediction mode and the selection mode, wherein the variable is associated with the index;

determining the four samples based on the variable;

in response to the variable being equal to a first value, determining two of the four samples among a plurality of top neighboring samples and other two of the four samples among a plurality of left neighboring samples;

in response to the variable being equal to a second value, determining two of the four samples among the plurality of the top neighboring samples and other two of the four samples among the plurality of the left neighboring samples, wherein the four samples determined when the variable being equal to the second value are different from the four samples determined when the variable being equal to the first value;

in response to the variable being equal to a third value, determining the four samples among the plurality of the left neighboring samples; and in response to the variable being equal to a fourth value, determining the four samples among the plurality of the top neighboring samples.

22. The non-transitory computer readable medium according to clause 21, wherein the index is binarized with a truncated unary code, in response to the variable being equal to the first value, the index is binarized to 1;

in response to the variable being equal to the second value, the index is binarized to 01;

in response to the variable being equal to the third value, the index is binarized to 001, and in response to the variable being equal to the fourth value, the index is binarized to 000.

23. The non-transitory computer readable medium according to clause 17, wherein in determining the predicted samples of the coding unit, the set of instructions that is executable by one or more processors of an apparatus to cause the apparatus to further perform:

determining a variable indicating a combination of a prediction mode and the selection mode, wherein the variable is associated with the index;

in response to the variable being equal to a value, determining the predicted samples of the coding unit based on the two parameters.

24. The non-transitory computer readable medium according to any one of clauses 17 to 23, wherein the index is binarized with a truncated unary code, a truncated binary code, or a fixed-length code.

25. A non-transitory computer readable medium storing a data stream, wherein the bitstream comprises:

an index associated with a coding unit based on the bitstream, the index indicating a selection mode among at least four selection modes.

In some embodiments, a non-transitory computer-readable storage medium is also provided. In some embodiments, the medium can store all or portions of the video bitstream having the flag that indicates the inter prediction mode and the index that indicates a selected pair selection mode. In some embodiments, the medium can store instructions that may be executed by a device (such as the disclosed encoder and decoder), for performing the above-described methods. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM or any other flash memory, NVRAM, a cache, a register, any other memory chip or cartridge, and networked versions of the same. The device may include one or more processors (CPUs), an input/output interface, a network interface, and/or a memory.

It should be noted that, the relational terms herein such as "first" and "second" are used only to differentiate an entity or operation from another entity or operation, and do not require or imply any actual relationship or sequence between these entities or operations. Moreover, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items.

As used herein, unless specifically stated otherwise, the term "or" encompasses all possible combinations, except where infeasible. For example, if it is stated that a database may include A or B, then, unless specifically stated otherwise or infeasible, the database may include A, or B, or A and B. As a second example, if it is stated that a database may include A, B, or C, then, unless specifically stated otherwise or infeasible, the database may include A, or B, or C, or A and B, or A and C, or B and C, or A and B and C.

It is appreciated that the above-described embodiments can be implemented by hardware, or software (program codes), or a combination of hardware and software. If implemented by software, it may be stored in the above-described computer-readable media. The software, when executed by the processor can perform the disclosed methods. The computing units and other functional units described in this disclosure can be implemented by hardware, or software, or a combination of hardware and software. One of ordinary skill in the art will also understand that multiple ones of the above described modules/units may be combined as one module/unit, and each of the above described modules/units may be further divided into a plurality of sub-modules/sub-units.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

In the drawings and specification, there have been disclosed exemplary embodiments. However, many variations and modifications can be made to these embodiments. Accordingly, although specific terms are employed, they are used in a generic and descriptive sense only and not for purposes of limitation.

What is claimed is:

1. A method of decoding a bitstream to output one or more pictures for a video stream, comprising:

receiving the bitstream;

decoding an index associated with a coding unit based on the bitstream, the index indicating a selection mode among at least four selection modes;

determining four samples based on the index;

determining two parameters based on the four samples;

determining predicted samples of the coding unit based on the two parameters; and decoding the coding unit based on the predicted samples;

wherein determining the four samples based on the index further comprises:

determining the four samples among a plurality of top neighboring samples and a plurality of left neighboring samples of the coding unit, wherein the four samples are determined at row[3W/8+1], row[5W/8+1], col[3H/8+1], and col[5H/8+1], wherein row[1, . . . , W] represents top neighboring reconstructed samples of the coding unit and col[1, . . . , H] represents left neighboring reconstructed samples of the coding unit, W and H represent a width and a height of the coding unit respectively.

2. The method according to claim 1, wherein determining the predicted samples of the coding unit further comprising:

determining a variable indicating a combination of a prediction mode and the selection mode, wherein the variable is associated with the index;

in response to the variable being equal to a value, determining the predicted samples of the coding unit based on the two parameters.

3. The method according to claim 1, wherein the index is binarized with a truncated unary code, a truncated binary code, or a fixed-length code.

4. A method of encoding a video sequence into a bitstream, the method comprising:

receiving the video sequence;

signal an index associated with a coding unit, the index indicating a selection mode among at least four selection modes;

determining four samples based on the index;

determining two parameters based on the four samples;

determining predicted samples of the coding unit based on the two parameters; and encoding the coding unit based on the predicted samples;

wherein determining the four samples based on the index further comprises:

determining the four samples among a plurality of top neighboring samples and a plurality of left neighboring samples of the coding unit, wherein the four samples are determined at row[3W/8+1], row[5W/8+1], col[3H/8+1], and col[5H/8+1], wherein row[1, . . . , W] represents top neighboring reconstructed samples of the coding unit and col[1,. . . , H] represents left neighboring reconstructed samples of the coding unit, W and H represent a width and a height of the coding unit respectively.

5. The method according to claim 4, wherein determining the predicted samples of the coding unit further comprising:

determining a variable indicating a combination of a prediction mode and the selection mode, wherein the variable is associated with the index;

in response to the variable being equal to a value, determining the predicted samples of the coding unit based on the two parameters.

6. The method according to claim 4, wherein the index is binarized with a truncated unary code, a truncated binary code, or a fixed-length code.

7. A non-transitory computer-readable storage medium storing a bitstream of a video for processing according to a method comprising:

decoding an index associated with a coding unit based on the bitstream, the index indicating a selection mode among at least four selection modes;

determining four samples based on the index;

determining two parameters based on the four samples;

determining predicted samples of the coding unit based on the two parameters; and decoding the coding unit based on the predicted samples;

wherein determining the four samples based on the index comprises:

determining the four samples among a plurality of top neighboring samples and a plurality of left neighboring samples of the coding unit, wherein the four samples are determined at row[3W/8+1], row[5W/8+1], col[3H/8+1], and col[5H/8+1], wherein row[1, . . . , W] represents top neighboring reconstructed samples of the coding unit and col[1, . . . , H] represents left neighboring reconstructed samples of the coding unit, W and H represent a width and a height of the coding unit respectively.

8. The non-transitory computer-readable storage medium according to claim 7, wherein determining the predicted samples of the coding unit further comprising:

determining a variable indicating a combination of a prediction mode and the selection mode, wherein the variable is associated with the index;

in response to the variable being equal to a value, determining the predicted samples of the coding unit based on the two parameters.

9. The non-transitory computer-readable storage medium according to claim 7, wherein the index is binarized with a truncated unary code, a truncated binary code, or a fixed-length code.

* * * * *